(12) United States Patent
Vecchione et al.

(10) Patent No.: US 12,534,548 B2
(45) Date of Patent: Jan. 27, 2026

(54) BLEACHING AGENT, PREPARATION AND USE OF THE SAME WITH POLYMERIZABLE COMPOSITIONS FOR OPTICAL MATERIALS

(71) Applicant: MITSUI CHEMICALS, INC., Tokyo (JP)

(72) Inventors: Andrea Vecchione, Ravenna (IT); Roberto Forestieri, Ravenna (IT); Francesco Mariani, Ravenna (IT); Willem Bos, Arnhem (NL)

(73) Assignee: MITSUI CHEMICALS, INC., Tokyo (JP)

( * ) Notice: Subject to any disclaimer, the term of this patent is extended or adjusted under 35 U.S.C. 154(b) by 771 days.

(21) Appl. No.: 17/774,680

(22) PCT Filed: Nov. 11, 2020

(86) PCT No.: PCT/JP2020/042098
§ 371 (c)(1),
(2) Date: May 5, 2022

(87) PCT Pub. No.: WO2021/095774
PCT Pub. Date: May 20, 2021

(65) Prior Publication Data
US 2022/0403065 A1    Dec. 22, 2022

(30) Foreign Application Priority Data

Nov. 12, 2019  (IT) ................. 102019000020979

(51) Int. Cl.
*C08F 18/16*   (2006.01)
*C08F 2/48*    (2006.01)
*C08F 18/18*   (2006.01)

(52) U.S. Cl.
CPC ............. *C08F 18/16* (2013.01); *C08F 2/48* (2013.01); *C08F 18/18* (2013.01)

(58) Field of Classification Search
None
See application file for complete search history.

(56) References Cited

U.S. PATENT DOCUMENTS

| 4,273,702 A * | 6/1981 | Leatherman ............ C08F 18/24 524/785 |
| 5,599,876 A | 2/1997 | Renzi et al. |
| 5,989,462 A * | 11/1999 | Buazza ............ B29D 11/00442 264/1.36 |
| 6,187,844 B1 * | 2/2001 | Murata .............. C08G 18/3876 524/196 |
| 6,367,928 B1 * | 4/2002 | Buazza ............... B29C 35/0894 351/159.34 |
| 6,416,307 B1 * | 7/2002 | Buazza .................. G02B 1/041 425/161 |
| 6,419,873 B1 * | 7/2002 | Buazza ............... B29C 35/0805 522/182 |
| 6,451,226 B1 * | 9/2002 | Buazza ............ B29D 11/00442 264/1.36 |
| 6,478,990 B1 * | 11/2002 | Powers .................. G02B 1/041 264/1.1 |
| 6,557,734 B2 * | 5/2003 | Buazza .................. B29C 37/005 222/518 |
| 6,634,879 B2 * | 10/2003 | Buazza .................. G02B 1/041 118/620 |
| 6,686,401 B1 | 2/2004 | Renzi et al. |
| 6,698,708 B1 * | 3/2004 | Powers .............. H05B 41/2988 249/105 |
| 6,712,596 B1 * | 3/2004 | Buazza ............... B29C 35/0288 425/808 |
| 6,729,866 B2 * | 5/2004 | Buazza .................. B29C 37/005 425/173 |
| 6,786,598 B2 * | 9/2004 | Buazza ............ B29D 11/00442 351/159.01 |
| 6,852,780 B2 * | 2/2005 | Fujita ..................... G02B 1/041 524/358 |
| 6,853,471 B2 * | 2/2005 | Sommer ................ G02C 7/104 359/240 |
| 6,939,899 B2 * | 9/2005 | Buazza ............... B29C 35/0288 351/159.63 |
| 6,964,479 B2 * | 11/2005 | Buazza ............ B29D 11/00442 351/159.74 |
| 7,261,845 B2 * | 8/2007 | Itoh ........................ C08F 18/24 264/1.32 |

(Continued)

FOREIGN PATENT DOCUMENTS

| AU | 2004201927 A1 * | 2/2005 | ....... B29D 11/00442 |
| EP | 1331494 A1 | 7/2003 | |

(Continued)

*Primary Examiner* — Sanza L. McClendon
(74) *Attorney, Agent, or Firm* — BUCHANAN INGERSOLL & ROONEY PC

(57) ABSTRACT

The present invention relates to a bleaching agent comprising: (A) a polymerizable component comprising an aromatic ester compound including two or more allyloxycarbonyl groups, (B) a colouring component comprising particles of a blue pigment (b1), (C) a polymeric dispersing agent to disperse the particles of the colouring component (B) in the polymerizable component (A), the particles of the colouring component (B) having an average size equal to or lower than 400 nm. The present invention also relates to the preparation and use of the above bleaching agent with polymerizable compositions for optical materials.

23 Claims, No Drawings

(56) References Cited

U.S. PATENT DOCUMENTS

| | | | |
|---|---|---|---|
| 8,129,466 B2* | 3/2012 | Polk | C09D 7/45 |
| | | | 526/284 |
| 8,394,906 B2* | 3/2013 | Christ | G02B 1/043 |
| | | | 526/261 |
| 9,411,076 B2* | 8/2016 | Slezak | G02B 1/04 |
| 9,441,064 B2* | 9/2016 | Inoue | C08F 216/125 |
| 11,204,445 B2* | 12/2021 | Fromentin | G02B 1/04 |
| 11,635,547 B2* | 4/2023 | Fromentin | C08L 35/02 |
| | | | 526/100 |
| 2018/0059437 A1 | 3/2018 | Kousaka et al. | |
| 2018/0265674 A1 | 9/2018 | Ogawa et al. | |
| 2021/0048559 A1* | 2/2021 | Fromentin | G02B 1/041 |

FOREIGN PATENT DOCUMENTS

| | | | | |
|---|---|---|---|---|
| EP | 3270212 | A1 | 1/2018 | |
| EP | 3381951 | A1 | 10/2018 | |
| JP | S60245607 | A | 12/1985 | |
| JP | H05194616 | A | 8/1993 | |
| JP | H10186291 | A | 7/1998 | |
| JP | 2003105227 | A | 4/2003 | |
| JP | 2004051851 | A * | 2/2004 | C08F 18/18 |
| JP | 2017-116857 | A | 6/2017 | |
| WO | WO-0018569 | A2 * | 4/2000 | B29D 11/00442 |
| WO | 0031584 | A2 | 6/2000 | |
| WO | WO-0056527 | A1 * | 9/2000 | B29D 11/00442 |
| WO | 0116194 | A1 | 3/2001 | |
| WO | WO-0144388 | A2 * | 6/2001 | C09B 7/0066 |
| WO | WO-0174135 | A2 * | 10/2001 | B29C 39/24 |
| WO | WO-0174571 | A2 * | 10/2001 | B29C 33/34 |
| WO | WO-0233447 | A1 * | 4/2002 | C08F 18/16 |
| WO | 2004063236 | A1 | 7/2004 | |
| WO | 2014/043473 | A1 | 3/2014 | |

* cited by examiner

BLEACHING AGENT, PREPARATION AND USE OF THE SAME WITH POLYMERIZABLE COMPOSITIONS FOR OPTICAL MATERIALS

TECHNICAL FIELD

The present invention relates to a bleaching agent, its preparation process and its use with polymerizable compositions for optical materials.

BACKGROUND ART

Polymeric materials, such as plastics, have been developed as alternatives and replacements for silica based inorganic glass in applications such as optical lenses, fiber optics, windows and automotive, nautical and aviation transparencies as well as transparent elements for electronic devices. These polymeric materials, also known as organic glasses, can provide advantages relative to glass, including, shatter resistance, lighter weight for a given application, ease of molding and ease of dyeing. Representative examples of such polymeric materials include allyl polymers such as poly(allyl carbonate) polymers. The allyl polymers, for example, are particularly suitable for producing organic glasses or transparent coating films, in particular ophthalmic lenses, or elements of optical devices.

Light that reaches and enters the human eye is divided into visible light, comprising wavelengths from about 380 to 780 nm, and non-visible light, which includes light in the ultraviolet (UV) range (wavelengths from about 280 to 380 nm) and the infrared range (Near IR light from about 780 to 1400 nm).

Since overexposure to UV radiation is known to be harmful for the human's eye and skin, in many applications it is desired that organic glasses, including spectacle lenses and sunglass lenses, possess ultraviolet (UV) light blocking properties, namely the organic glasses should be capable of cutting off light in certain ranges of UV wavelengths, e.g. 380 nm to 450 nm.

To produce organic glasses having UV cutting properties, UV absorbing compounds (UV absorbers), such as pigments or dyes capable of absorbing UV radiations, are generally incorporated in the allyl resin forming the glass.

For example, JP H10186291, JP S60245607 and EP 3270212A1 disclose transparent, optical articles based on allyl polymers and having UV cut-offs in the UV region of the light spectrum, that are prepared by using selected benzophenone and benzotriazole compounds as UV absorbers.

In general, the amount of UV absorbers that has to be incorporated in the polymerizable composition mainly depends on the desired UV cut-off, i.e. the desired UV wavelength at which the total light transmittance of a lens having a given thickness is lower than a desired threshold.

In order to produce lenses capable of cutting off UV light, relatively high amounts of UV absorbers need to be incorporated in the polymerizable composition, for example up to 3.0 wt % based on the weight of the polymerizable composition. The incorporation of high amounts of UV absorbers, however, leads to polymer materials having a yellow colour, the intensity of which increases with the increase of the amounts of UV absorbers present in the material. The yellow colour renders the polymer material unsuitable for the production of neutral, i.e. colourless, lenses. Yellowing is thus a relevant problem specially when lenses having a cut-off wavelength in the violet-blue region, i.e. within the wavelength range 380 nm to 500 nm, particularly 400 nm to 420 nm (the so-called "High Energy Visible" (HEV) light or "blue light"), have to be manufactured.

Yellowing, on the contrary, does not represent a particular disadvantage in the manufacturing of sunglass lenses, since after polymerization the lenses obtained are tinted with dyes that completely mask the yellow colour.

In the known art, to overcome the above drawbacks and produce transparent, neutral lenses, it is known to "bleach" (or "blue") the polymer material by incorporating colouring agents into the polymerizable composition. The colouring agents, also known as "bleaching agents" or "bluing agents", generally comprises at least one colouring compound having a blue colour, that interacts with the incident light radiation to compensate the yellow colour brought about by the UV absorbing compounds. This bleaching effect makes the colour of the lens be perceived as neutral by a human's eye.

The bleaching agents are typically incorporated in the polymerizable composition in the form of a concentrated composition (masterbatch). A bleaching agent in the form of a masterbatch generally comprises: (i) a polymerizable component, e.g. based on an allyl resin; (ii) a colouring component comprising at least one blue pigment or dye, possibly in combination with pigments of a colour other than blue; (iii) optionally a dispersant to maintain the colouring component well dispersed in the polymerizable component (i).

Bleaching agents may thus contain dyes, i.e. colouring compounds which are substantially soluble in the polymerizable composition, or pigments, i.e. colouring compounds which are substantially insoluble in the polymerizable composition and thus remain suspended therein.

When insoluble pigments are used, the bleaching agents are generally prepared by homogenizing the pigment particles dispersed in the polymerizable component using mixing devices, such as stirrers, dispersers, ball or roll mills, as described, for example, in JP H05194616, EP 1331494A1, JP 2003105227 and U.S. Pat. No. 9,411,076B2.

The average particle size of the pigment particles used to bleach the polymerizable composition is known to be an important factor to control haze in the polymerized lenses. U.S. Pat. No. 9,411,076, for example, discloses polymerizable compositions comprising: (a) allyl diglycol carbonate; (b) a pigment component comprising: (i) an ionic or amphoteric dispersant material; and (ii) pigment nanoparticles uniformly dispersed in the dispersant material (i), wherein the nanoparticles have an average particle size up to 500 nanometers. In U.S. Pat. No. 9,411,076, the use of particles having a size larger than 500 nm is not recommended because it is said to often leads to increased haze in the polymerized product. In U.S. Pat. No. 9,411,076, the pigment dispersion is obtained through a two-step process which includes: (i) a pre-dispersion step carried out by milling a mixture of pigment particles and a polymeric dispersant using a basket mill; (ii) a final dispersion step that is accomplished by further milling the mixture in a bead mill using YTZ grinding media.

The effectiveness of a bleaching agent to mask the yellow colour imparted by the UV absorbers depends on a number of factors.

Soluble dyes, for example, have the advantage, compared to insoluble pigments, of correcting the undesired yellow colour without increasing significantly the haze of the final lens. In fact, because of their substantially complete solubility in the polymerizable composition, dyes minimize the diffusion of the incident light within the polymerized products and thus reduce haze.

Compared to insoluble pigments, however, dyes have the disadvantage of being more prone to decompose during the polymerization reaction in the presence of certain radical polymerization initiators, especially peroxide initiators such as alkyl peroxide compounds (e.g. isopropyl peroxydicarbonate (IPP) and isopropyl-sec-butyl peroxydicarbonate) and aroyl peroxide compounds (e.g. benzoyl peroxide). The degradation of dyes during the curing step reduces their effectiveness as bleaching agents. Peroxide initiators, however, are one of the most used classes of radical polymerization initiator employed as curing agents of allyl-based polymerizable compositions.

Bleaching agents containing insoluble pigments are more resistant than dyes to the decomposition caused by the oxidative action of the radical polymerization initiators. Pigment particles, however, have a higher tendency to aggregate forming colloids in the polymerizable composition, which may interfere with the incident light radiation (so-called Tyndall effect) increasing the haze of the polymer material. The Tyndall effect is especially marked when the particles size of the pigment or colloidal aggregates is close to the wavelength of the incident light radiation.

To improve the effectiveness of soluble dyes as bleaching agents, polymerization initiators capable of generating free radical species that do not significantly deteriorate dyes have been suggested for example in U.S. Pat. No. 5,599,876, WO 2001/16194, WO 2000/31584 and EP 3381951A1. The polymerization of allyl polymers in the presence of these weaker radical polymerization initiators, however, requires higher curing temperatures in order to properly generate free radicals capable of completely curing the polymerizable composition. Curing at higher temperatures, in turn, results in polymerized materials that are brittle and prone to break or be damaged during the demolding step of the cured product. In addition, in the presence of these initiators longer curing cycles are needed to reach a satisfactory polymerization level of the lenses, thus decreasing the productivity of the manufacturing process.

The preparation of ophthalmic lenses or optical elements using pigment-containing bleaching agents are disclosed for example in JP H05-194616, EP 1331494A1, JP 2003105227 and U.S. Pat. No. 9,411,076B2.

The effectiveness of a bleaching agent also depends on its stability, namely the capability of the bleaching agent dispersion of preventing the uncontrolled formation of flocculates (i.e. aggregates). When a pigment dispersion is not sufficiently stabilized, precipitation of the pigment particles may occur easily inside the container (the so called "cake effect"), which alters the chemical composition of the bleaching agent. Clearly, modifications of both the total content of pigment particles as dispersed phase and the ponderal ratios between pigment particles of different colours with respect to the initial formulation of the bleaching agent may strongly affect the color and optical quality of the final optical materials as well as the reproducibility of their characteristics. In view of this phenomenon, pigment dispersions are generally carefully re-dispersed before being used to prepare polymerizable compositions, for example by subjecting them to mixing, shaking or sonication treatments. Quite often, however, these treatments do not lead to the complete redispersion of the pigment particles. Therefore, in order to use bleaching agents showing optimal and reproducible bleaching effects, the stabilization of the pigment dispersion is of the utmost importance.

SUMMARY OF INVENTION

Problem that the Invention is to Solve

In view of the above-described state of the art, Applicants have faced the problem of overcoming or at least ameliorate some of the drawbacks set out above. Particularly, a scope of the present invention is to provide a bleaching agent enabling the production of plastic optical materials, especially based on allyl polymers, particularly ophthalmic lenses that are transparent, colourless, have minimal haze and exhibit UV-light blocking function, especially in the blue light wavelength region of the spectrum, i.e. within the range 400 nm to 450 nm, preferably 400 nm to 420 nm. These optical properties have to be achieved without impairing, as much as possible, other favourable properties of the plastic materials, namely mechanical properties such as hardness, impact strength and resistance to abrasion.

Means for Solving the Problem

Applicants have now found that the above technical problem and others that will more clearly appear from the following disclosure can be at least partly solved by a bleaching agent in which an improved stabilization of the pigment particles is obtained through the combined action of an aromatic allyl-based polymerizable component and a polymeric dispersant.

Because of the improved stabilization effect, the bleaching agent described herein enables to efficiently incorporate pigment particles of very small average size (e.g. equal to or lower than 400 nm expressed as z-average size) and having low tendency to agglomerate, in an allyl-based polymerizable composition. The bleaching agent is particularly effective for correcting the yellow colour caused by the relatively high concentration of the UV absorber, while keeping the total light transmittance (T %) and haze of the cured polymer material at good levels. This improvement is obtained without substantially affecting other optical properties of the lenses, such as the refractive index and the Abbe number.

Additionally, since the bleaching effect is obtained using pigments instead of dyes, peroxide free-radical polymerization initiators can be advantageously used for curing the polymerizable composition, thus obtaining a cured polymer material exhibiting excellent mechanical properties, such as hardness, impact strength and resistance to abrasion.

With the present invention, therefore, optical articles having excellent mechanical and optical properties and that are transparent, colourless and cut HEV light in the range of wavelengths 400 to 420 nm, in addition to substantially blocking all UV wavelengths (i.e. a total transmittance T is 1% or less for wavelengths of 400 nm or less), can be easily manufactured.

Moreover, as it will be described in detail below, bleaching agents containing stable dispersion of pigment particles according to the present description can be prepared in a very easy and effective way by direct sonication or a high-pressure homogenization treatment.

The enhanced level of dispersibility of the pigment dispersion, as measured for example by the polydispersity index (PDI), also allows to overcome or at least reduce the drawbacks connected to the cake effect. Furthermore, the high level of dispersion of the pigment prevents pigment particles from being retained by the filters normally used to purify the polymerizable composition before casting, thus increasing the effectiveness of the bleaching agent with cost saving.

Without wishing to be bound to any theory, it is believed that the enhanced stability of the bleaching agent is brought about by the aromaticity of its allyl-based polymerizable component, which increases the chemical affinity of the dispersing phase towards the dispersed pigment particles.

Therefore, according to a first aspect the present invention relates to a bleaching agent comprising:
(A) a polymerizable component comprising an aromatic ester compound including two or more allyloxycarbonyl groups,
(B) a colouring component comprising particles of a blue pigment (b1),
(C) a polymeric dispersing agent to disperse the particles of the colouring component (B) in the polymerizable component (A), wherein the particles of the colouring component (B) have a z-average size equal to or lower than 400 nm, as measured by Dynamic Light Scattering technique according to the method ISO 22412:2017.

According to a second aspect, the present invention relates to a process for preparing the above bleaching agent comprising the following steps in sequence:
providing a pre-mixture by mixing:
(A) a polymerizable component comprising an aromatic ester compound including two or more allyloxycarbonyl groups,
(B) a colouring component comprising particles of a blue pigment (b1),
(C) a polymeric dispersing agent to disperse the particles of the colouring component (B) in the polymerizable component (A);
homogenizing the pre-mixture to obtain a bleaching agent in which the particles of the colouring component (B) have a z-average size equal to or lower than 400 nm, as measured by Dynamic Light Scattering technique according to the method ISO 22412:2017.

According to a third aspect, the present invention relates to a polymerizable composition for an optical material comprising:
(A) a polymerizable component comprising an aromatic ester compound including two or more allyloxycarbonyl groups,
(B) a colouring component comprising particles of a blue pigment (b1);
(C) a polymeric dispersing agent to disperse the particles of the colouring component (B) in the polymerizable component (A);
(D) an ultraviolet absorbing agent; and
(E) a radical polymerization initiator,
wherein the particles of the colouring component (B) have a z-average size equal to or lower than 400 nm, as measured by Dynamic Light Scattering technique according to the method ISO 22412:2017, and
the polymeric dispersing agent (C) comprises a polymeric part and one or more pigment affinitive-groups selected from: carboxylic group, sulphate group, sulphonate group, amine salts, phosphate group, phosphonate group, carbamate group, urea group, amide group or amine group.

According to a fourth aspect, the present invention relates to a process for preparing a polymerizable composition for an optical material comprising the following steps in sequence:
providing a bleaching agent according to the process for preparing the above bleaching agent,
mixing the bleaching agent with (AA) a polymerizable component comprising a compound including two or more allyloxycarbonyl groups and (D) an ultraviolet absorbing agent and (E) a radical polymerization initiator.

According to other aspects, the present invention relates to a molded article obtained by curing the above defined polymerizable composition as well as an optical material and a plastic lens comprising the moulded article.

According to a further aspect, the present invention relates to a method for manufacturing a plastic lens comprising the following steps in sequence:
i) providing a polymerizable composition for an optical material according to the present invention as above defined;
ii) casting the polymerizable composition in a mould;
iii) curing the polymerizable composition to obtain a plastic lens.

Further characteristics of the present invention are illustrated in the dependent claims annexed to the present description.

The compositions of the present invention can comprise, consist essentially of, or consist of, the essential components as well as optional ingredients described herein. As used herein, "consisting essentially of" means that the composition or component may include additional ingredients, but only if the additional ingredients do not materially alter the basic and novel characteristics of the claimed compositions or methods.

As used herein, the articles "a", "an" and "the" should be read to include one or at least one and the singular also includes the plural, unless it is obvious that it is meant otherwise. This is done merely for convenience and to give a general sense of the disclosure.

Other than in the operating examples, or where otherwise indicated, all numbers expressing quantities of ingredients, reaction conditions, and so forth used in the specification and claims are to be understood as modified in all instances by the term "about."

As used therein, the values of "z-average particles size" and "polidispersity index" are meant to be determined by Dynamic Light Scattering technique according to the method ISO 22412:2017. The z-average particle size is the intensity-weighted mean diameter derived from the cumulants analysis as described in ISO 22412:2017.

As used herein, the terms used to identify coloured pigments, such as blue pigment, red pigment, yellow pigment, violet pigment, pink pigment, green pigment, black pigment, white pigment and the like, refer to the Colour Index classification published by the Society of Dyers and Colourists, American Association of Textile Chemists and Colourists.

The expressions light "cut ratio" and "cut off ratio" are used herein in an interchangeable manner; they represent the value of transmittance, at a given wavelength WL (e.g. WL=400 nm, 405 nm, 410 nm), measured on a moulded article in the form of a flat plate having a thickness of 2 mm, if not specified otherwise, and expressed as percentage according to the following formula:

$$\text{Cut Off ratio}_{(WL)}\% = 100(\%) - \text{Transmittance (\%) at the WL.}$$

The (light) cut off wavelength is meant as the highest wavelength below which the light transmission becomes lower than 1%.

BEST MODE FOR CARRYING OUT THE INVENTION

A description of the bleaching agent according to the present invention, its preparation process and its use to bleach polymerizable compositions for optical materials will be given through the following embodiments.

As said above, the bleaching agent according to the present invention comprises:
- (A) a polymerizable component comprising an aromatic ester compound including two or more allyloxycarbonyl groups,
- (B) a colouring component comprising particles of a blue pigment (b1),
- (C) a polymeric dispersing agent to disperse the particles of the colouring component (B) in the polymerizable component (A), the particles of the colouring component (B) having average size equal to or lower than 400 nm; the above weight percentages being referred to the weight of said component (A).

Each component of the bleaching agent composition will be described below.

(A) Polymerizable compound comprising an aromatic ester compound including two or more allyloxycarbonyl groups The polymerizable component (A) comprises an aromatic ester compound including two or more allyloxycarbonyl groups. In an embodiment, it is possible to represent such a compound including two or more allyloxycarbonyl groups by the following formula (1)

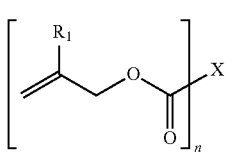

(1)

wherein, in the formula, n is an integer of 2 to 6, $R_1$ indicates a hydrogen atom or a methyl group, a plurality of present $R_1$'s may be the same or different, X is a divalent to hexavalent organic group derived from an aromatic compound having 6 to 12 carbon atoms.

Specific examples of the aromatic ester compound (A) including two or more allyloxycarbonyl groups include an allyl ester polymerizable compound (A2), and a polymerizable compound (A3) including at least one allyl ester group and optionally at least one allyl carbonate group.

It is possible for the aromatic ester compound including two or more allyloxycarbonyl groups to include an oligomer thereof. An aromatic ester compound including two or more allyloxycarbonyl groups is a liquid product at room temperature, the viscosity measured at 25 degree C. is 10 to 1000 cSt, and it is possible to change the oligomer content in a wide range, for example, 0 to approximately 80% by weight.

Allyl Ester Polymerizable Compound (A2), Polymerizable Compound (A3)

Specific examples of the allyl ester polymerizable compound (A2) include diallyl phthalate represented by General Formula (3) and oligomers thereof, and allyl ester compounds represented by General Formula (4) and oligomers thereof obtained by transesterification reaction of a mixture of diallyl phthalate and a polyol. Examples of the polymerizable compound (A3) include a polymerizable compound represented by General Formula (5) including at least one allyl ester group and at least one allyl carbonate group and oligomers thereof.

The polymerizable compound represented by General Formula (5) includes a mixture of an allyl ester compound, an allyl carbonate compound, and compounds having an allyl ester group and an allyl carbonate group, obtained by transesterification reaction of a mixture of dialkyl phthalate, allyl alcohol, diallyl carbonate, and a polyol.

In the present embodiment, the compounds of general Formulas (3) to (5) include regioisomers.

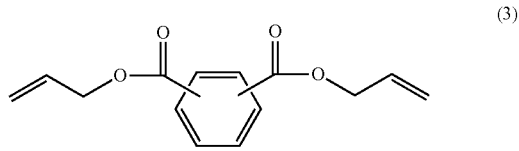

(3)

The diallyl phthalate represented by General Formula (3) is at least one kind selected from diallyl isophthalate, diallyl terephthalate, and diallyl orthophthalate.

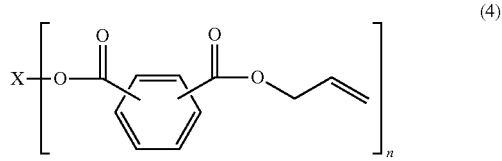

(4)

In Formula (4), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6.

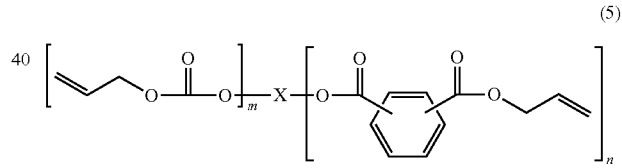

(5)

In Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6.

In an embodiment, the polymerizable component is a compound or a mixture of compounds selected from those having the following Formulas (3) to (5) and mixtures thereof, with the proviso that when no compounds of Formula (3) and (4) are present, in the Formula (5) n represents integers of 1 to 6 and the sum of m and n is an integer of 2 to 6.

The polymer component (A) may include also an aliphatic compound including two or more allyloxycarbonyl group, such as the compound of Formula (5) above wherein in Formula (5) n=0. Preferably, the total amount of the said aliphatic compound is equal to or lower than 30 wt % referred to the weight of the polymer component (A).

In an embodiment, the polymerizable component is a mixture comprising:
- at least one allyl ester compound of Formulas (3) or (4), and/or one compound having an allyl ester group and an allyl carbonate group of Formula (5);
- at least one allyl carbonate compound of formula (II)

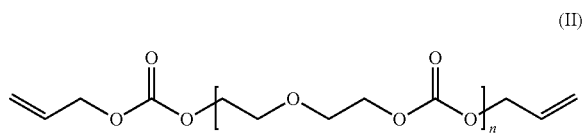
(II)

wherein, in the formula (II), n is equal to or higher than 1 and equal to or lower than 10.

Specific examples of the polyol (aliphatic diol, aliphatic polyol) forming X in Formula (4) and Formula (5) include diols of ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane; triols of glycerol and trimethylolpropane; and polyols of tris(hydroxyethyl) isocyanurate, pentaerythritol, digylcerol, ditrimethylol propane, and dipentaerythritol.

It is possible for the compounds of Formula (4) and Formula (5) to include oligomers thereof. The oligomer in Formula (4) is produced by transesterification reaction of an allyl ester compound produced in a production step and a polyol. The oligomer in Formula (5) is produced by transesterification reaction of the allyl ester compound or the allyl carbonate compound produced in the production step and the polyol.

Accordingly, the allyl ester polymerizable compound (A2) or the polymerizable compound (A3) includes at least one kind selected from, for example, a diallyl phthalate compound selected from diallyl isophthalate, diallyl terephthalate, and diallyl orthophthalate; diallyl ester compounds and oligomers thereof obtained by transesterification reaction between the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and the like; a polyallyl ester compound and an oligomer thereof obtained by transesterification reaction between the diallyl phthalate and a mixture of at least one kind of polyol selected from triols of glycerol and trimethylolpropane, tris(hydroxyethyl) isocyanurate, pentaerythritol, digylcerol, ditrimethylol propane, dipentaerythritol, and the like; and an allyl ester compound, an allyl carbonate compound, a compound having an allyl carbonate group and an allyl ester group, and oligomers thereof, obtained by transesterification reaction of a mixture of at least one kind of dialkyl phthalate having 1 to 3 carbon atoms selected from dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate, an allyl alcohol, diallyl carbonate, and the diol or polyol described above.

More specifically, the allyl ester polymerizable compound (A2) or the polymerizable compound (A3) preferably includes at least one kind selected from: (i) a mixture of diallyl terephthalate and a diethylene glycol bis (allyl carbonate) compound at 30% by weight with respect to the diallyl terephthalate and an oligomer thereof, (ii) an allyl ester compound obtained by transesterification reaction of a mixture of diallyl terephthalate and propylene glycol; (iii) a mixture of the allyl ester compound of (ii) and a diethylene glycol bis(allyl carbonate) compound at 20% by weight with respect to the allyl ester compound and an oligomer thereof; (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis (allyl carbonate) compound at 10% by weight with respect to the mixture and an oligomer thereof.

The following are preferable examples of the allyl ester polymerizable compound (A2) or the polymerizable compound (A3) suitable for the purposes of the present invention: a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol.

It is possible for the allyl ester polymerizable compound (A2) or the polymerizable compound (A3) described above to be defined by the Formulas (III) and (V), the diallyl terephthalate of Formula (III) is the main component thereof, and each includes an oligomer obtained by transesterification reaction with a polyol.

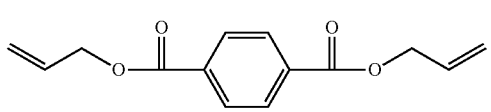
(III)

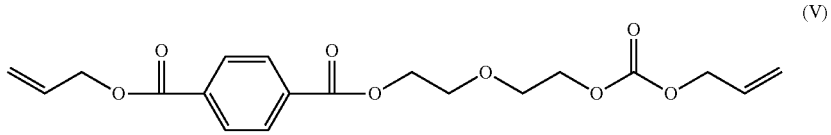
(V)

The allyl ester polymerizable compound (A2) or the polymerizable compound (A3) described above may also include a compound of Formula (IV).

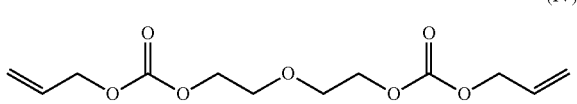

According to the present invention, it is possible to select the aromatic ester compound (A) including two or more allyloxycarbonyl groups as a mixture of the allyl ester polymerizable compound (A2) and/or the polymerizable compound (A3) and oligomers thereof with the allyl carbonate polymerizable compound (A1) and an oligomer thereof.

(B)—Colouring Component

According to the present invention, the bleaching agent comprises a colouring component (B) comprising at least particles of a blue pigment (b1).

According to the present invention, the blue pigment incorporated in the optical material functions to achromatize initial coloring and prevent yellowing, in particular yellowing originated by the UV absorber compound, thus improving colorlessness and transparency of the cured product.

The blue pigment is preferably a pigment which is not degraded by a radical initiator used as a curing agent for the polymerizable composition.

The blue pigment may be selected, for example, from: ultramarine, which is composed of sulfur-containing sodium-aluminosilicate; Prussian blue, which is composed mainly of ferric ferrocyanide; cobalt blue, which is composed of cobalt oxide and alumina; phthalocyanine blue, which is composed of copper phthalocyanine; and mixture thereof.

Among these examples, ultramarine is particularly preferred for its little tendency to decompose when organic peroxide radical initiators are used as a curing agent.

The ultramarine has cobalt and violet colors.

The ultramarine pigments are sodium aluminum silicates of sodalite structure which contain sulfur species. The sodalite of formula $Na_6(Al_6Si_6O_{24})$ is formed of juxtaposed sodalite cages (truncated cuboctahedra). The ultramarine pigment chromophores are polysulfide radicals $S_3^-$ (blue) and $S_2^-$ (yellow). These chromophores are hosted in the sodalite cages in the form of $NaS_3$ and $NaS_2$ salts. The hue of the pigments is related to the concentration of these chromophores.

The bleaching agent may optionally contain other pigments than the blue pigment in order to adjust the colour hues in the final product. The type and content of the other pigments may suitably be selected depending on the purpose.

In a preferred embodiment, the colouring component (B) includes particles of one or more further pigments (b2) other than the blue pigment (b1). Preferably, the one or more pigments (b2) are selected from organic pigments, preferably azo pigments. More preferably the pigment (b2) is selected from: quinacridone red (e.g. Hostaperm Pink E by Clariant Produkte, Germany), perylene red, pigment red based on pyrrolo[3,4-c]pyrrole compounds (e.g. Hostaperm Red D3G70 by Clariant Produkte, Germany), dioxazine violet and mixture thereof.

The pigment particles of the colouring component (B) suspended in the bleaching agent or polymerizable composition have a z-average size equal to or lower than 300 nanometers (nm), preferably equal to or lower than 280 nm, more preferably equal to or lower than 250 nm, even more preferably equal to or lower than 200 nm.

Preferably, the pigment particles suspended in the bleaching agent or polymerizable composition have a z-average size equal to or higher than 20 nm, more preferably equal to or higher than 50 nm, even more preferably equal to or higher than 100 nm.

The pigment particles may also have a z-average size in any interval that is a combination of any of the above z-average size values.

Preferably, the bleaching agent composition comprises pigment particles in a total amount within the range of from 0.1% to 5.0% by weight, more preferably from 1.0% to 3.0% by weight, even more preferably from 1.5% to 3% by weight, based on the weight of the polymerizable component (A) of the bleaching agent composition.

Preferably, the blue pigment particles (b1) are present in the colouring component (B) in an amount within the range of from 1% to 4% by weight, preferably from 1.5% to 2.5%, based on the weight of the polymerizable component (A) of the bleaching agent composition.

Preferably, the weight ratio between the particles of the pigment (b1) and the particles of the pigment (b2) in the bleaching agent and in the polymerizable composition is within the range of from 5:1 to 15:1.

Preferably, the bleaching agent is added to the polymerizable composition in such an amount that the total amount of pigment particles of the pigmenting component (B) in the polymerizable composition is within the range of from 0.1 ppm to 300 ppm by weight, more preferably from 1.0 ppm to 200 ppm by weight, based on the total weight of the polymerizable component of the polymerizable composition.

As used herein, unless it is explicitly stated differently or it is obvious that it is meant otherwise, the expression "total weight of the polymerizable component of the polymerizable composition" means the total amount of the polymerizable component (AA) introduced in the polymerizable composition as monomer or oligomer and the polymerizable component (A) that forms the bleaching agent or possibly used as vehicle to introduce any other ingredient in the polymerizable composition to be casted (e.g. radical polymerization initiators, UV absorbers, etc.).

Preferably, the bleaching agent is added to the polymerizable composition in such an amount that the blue pigment particles (b1) of the component (B) are present in an amount within the range of from 0.05 ppm to 250 ppm by weight, preferably from 1.0 ppm to 180 ppm, based on the weight of the of the polymerizable component of the polymerizable composition.

(C) Polymeric Dispersing Agent

The polymerizable composition according to the present invention contains at least one polymeric dispersing agent to aid the dispersion of the pigment particles in the polymerizable component (A), thus preventing their flocculation, aggregation and sedimentation in the bleaching agent and in the polymerizable composition in which the bleaching agent is incorporated.

Typically, the polymeric dispersing agents comprise a polymeric part and one or more pigment-affinitive groups. Often, these dispersants are built as comb polymers having one or more polymer chains and one or more pigment-affinitive groups. Generally, a polymeric dispersant with a single polymer chain has a pigment-affinitive group at a terminal position. Other types of polymeric dispersants can have a backbone with pigment-affinitive groups and have polymeric tails which are soluble in the polymer into which they are incorporated. Generally, the pigment-affinitive groups are groups with high polarity, e.g. ionic groups, such as carboxylic, sulphate, sulphonate, amine salts, phosphate or phosphonate groups. Non-ionic groups, such as carbamate, urea, amide or amine groups, can also be suitable pigment-affinitive groups.

The polymeric part can be selected from: copolymers of vinyl or allyl amine monomers with carboxylic acid monomers (e.g. acrylic acid), copolymers of carboxylic acid monomers and amide monomers, such as poly(acrylic acid-co-acrylamide) and/or salts thereof.

A preferred polymeric dispersing agent is poly(acrylic acid-co-acrylamide) and salts thereof (PAA-PAM), preferably having a molar ratio of acrylic acid to acrylamide monomer of 60:40, and a Mw of at least 50,000 g/mol, more preferably at least 200,000 g/mol.

Another preferred polymeric dispersing agent is a polymer, preferably a poly(acrylic acid-co-acrylamide), bearing amine and carboxylic acid functional groups, such as the polymeric dispersing agent sold under the trade name DISPERBYK 191 (BYK-Chemie GmbH; Wesel, Germany), and which reportedly has an acid number of 30 mg KOH/g (ASTM D974) and an amine value of 20 mg KOH/g (ASTM D2073-92).

The polymeric dispersing agent (C) is different from the polymerizable component (A) of the bleaching agent, i.e. the polymeric dispersing agent (C) excludes from its definition any compound that is used as polymerizable component (A).

Suitable dispersants are for instance the Disperbyk dispersants from Byk Chemie, the Solsperse, Solplus and Ircosperse dispersants, available from Lubrizol Advanced Materials, the Efka dispersants from Ciba, the Tego dispersants from Degussa, and the Nuosperse dispersants from Elementis Specialies.

In an embodiment, the dispersant is derived from an acrylic polymer and/or polycaprolactone, such as the commercial product SOLSPERSE 32500. An alternative suitable acrylic polymeric dispersant may be prepared from glycidyl methacrylate, n-butyl methacrylate, N-butyl acrylate, and hydroxypropyl methacrylate.

The above polymeric dispersing agents may be used alone, or two or more of these may be used as a mixture.

The bleaching agent comprises the polymeric dispersing agent (C) in an amount within the range of from 0.5% to 10.0% by weight, preferably from 1.0% to 5.0%, even more preferably from 1.0% to 3.0%, based on the weight of the of the polymerizable component (A) of the bleaching agent.

Preferably, the bleaching agent is added to the polymerizable composition in such an amount that the polymeric dispersing agent (C) in the polymerizable composition is within the range of from 0.1 to 300 ppm by weight, preferably from 1 to 200 ppm, based on the weight of the of the polymerizable component of the polymerizable composition.

Polymerizable Compositions (AA) Polymerizable compound including two or more allyloxycarbonyl groups One aspect of the present invention relates to the polymerizable composition for an optical material comprising:
(AA) a polymerizable component comprising a compound including two or more allyloxycarbonyl groups;
(BB) a bleaching agent according to the present description;
(D) an ultraviolet absorbing agent;
(E) a radical polymerization initiator, preferably an organic peroxide radical polymerization initiator.

The polymerizable component (AA) can be selected among a wide variety of polymerizable compounds, which may include monomers, oligomers and/or prepolymers, having at least two allyl groups as polymerizable functional groups.

The polymerizable component (AA) may comprise, for example, polymer compounds containing two or more ethylenically unsaturated groups, such as diallyl esters, diallyl carbonate, diallyl phthalate, allyl (meth)acrylate, vinyl meth (acrylate).

In an embodiment, it is possible to represent such a polymerizable component (AA) by the following formula (1).

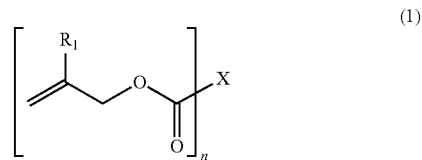

wherein, in the formula, n is an integer of 2 to 6, $R_1$ indicates a hydrogen atom or a methyl group, a plurality of present $R_1$'s may be the same or different, X is a divalent to hexavalent organic group a derived from a linear or branched aliphatic polyol having 3 to 12 carbon atoms which may have an oxygen atom, a divalent to hexavalent organic group b derived from an alicyclic polyol having 5 to 16 carbon atoms which may have an oxygen atom, or a divalent to hexavalent organic group c derived from an aromatic compound having 6 to 12 carbon atoms, and the organic group a or the organic group b forms an allyl carbonate group by bonding to an allyloxycarbonyl group via an oxygen atom derived from a hydroxyl group.

These polyols normally include 2 to 6 hydroxyl groups in the molecule, and it is possible for these polyols to include 2 to 4 hydroxyl groups in the molecule, which is preferable.

Examples of the aliphatic polyol a1 include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, glycerol, trimethylolpropane, tris(hydroxyethyl) isocyanurate, pentaerythritol, dipentaerythritol, and the like.

Examples of the alicyclic polyol b1 include 1,4-dimethylolcyclohexane, 4,8-bis(hydroxymethyl)-[5.2.1.0$^{2.6}$]tricyclodecane, and the like.

Examples of the aromatic compound ci include benzene, toluene, xylene, naphthalene, and the like.

Specific examples of the compound including two or more allyloxycarbonyl groups include an allyl carbonate polymerizable compound (A1), an allyl ester polymerizable compound (A2), and a polymerizable compound (A3) including at least one of an allyl carbonate group and an allyl ester group.

It is possible for the compound (A) including two or more allyloxycarbonyl groups to include an oligomer thereof. A compound including two or more allyloxycarbonyl groups is a liquid product at room temperature, the viscosity measured at 25 degree C. is 10 to 1000 cSt, and it is possible to change the oligomer content in a wide range, for example, 0 to approximately 80% by weight.

Allyl Carbonate Polymerizable Compound (A1) The allyl carbonate polymerizable compound (A1) can be represented by Formula (2)

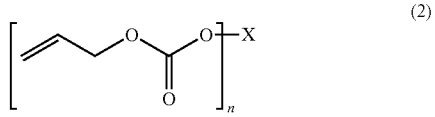

wherein, in Formula (2), X represents a divalent to hexavalent group derived from a linear or branched aliphatic polyol having 3 to 12 carbon atoms or a divalent to hexavalent group derived from an alicyclic polyol having 5 to 16 carbon atoms, and n represents an integer of 2 to 6.

The allyl carbonate polymerizable compound (A1) of Formula (II) may include an oligomer thereof. The oligomer is a poly(allyl carbonate) in which two or more molecules of a polyol are linked via a carbonate group produced by transesterification reaction of allyl carbonate produced in the production step and a polyol.

The allyl carbonate polymerizable compound is a poly (allyl carbonate) compound of a linear or branched aliphatic polyol having 3 to 12 carbon atoms. A poly(allyl carbonate) compound of an alicyclic polyol having 5 to 16 carbon atoms in the molecule is also suitable for this purpose. These polyols usually have 2 to 6 hydroxyl groups in the molecule and it is possible for these polyols to have 2 to 4 hydroxyl groups in the molecule, which is preferable. It is also possible to use a mixed poly(allyl carbonate) compound, that is, a compound which is derived from at least two kinds of polyols and which can be obtained by mechanical mixing of the respective polyol poly(allyl carbonate) compounds, or a compound obtained directly by a chemical reaction starting from a mixture of polyols and diallyl carbonate.

Finally, it is possible for all these poly(allyl carbonate) compounds to be in the form of monomers or mixtures of monomers and oligomers. Generally, the allyl carbonate polymerizable compound is a liquid product at room temperature, the viscosity measured at 25 degree C. is 10 to 1000 cSt, and it is possible to change the oligomer content in a wide range, for example, 0 to approximately 80% by weight.

Specific examples of the polyols forming X in General Formula (2) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2.6}$]tricyclodecane, glycerol, trimethylolpropane, tris(hydroxyethyl) isocyanurate, pentaerythritol, digylcerol, ditrimethylolpropane, dipentaerythritol, and the like.

Accordingly, examples of the allyl carbonate compounds include at least one kind selected from bis(allyl carbonate) compounds of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1, 5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2.6}$]tricyclodecane; tris (allyl carbonate) compounds of at least one kind of triol selected from glycerol, trimethylolpropane, and tris(hydroxyethyl) isocyanurate; tetra(allyl carbonate) compounds of at least one kind of tetraol selected from pentaerythritol, digylcerol, and ditrimethylol propane; dipentaerythritol hexa (allyl carbonate) compounds; and a mixed poly(allyl carbonate) compound of at least two kinds of compounds selected from the diols, the triols, the tetraols, and the dipentaerythritol.

The "bis(allyl carbonate) of a mixture of at least two kinds of diols" is, for example, obtained as a mixture of the following monomer components and oligomer components in a case where the diols are diethylene glycol and neopentyl glycol:

Monomer Component:
(1) diethylene glycol bis(allyl carbonate);
(2) neopentyl glycol bis(allyl carbonate);

Oligomer Component:
(3) oligomer including only hydrocarbons (and ethers) derived from diethylene glycol (a compound having a structure in which two hydroxyl groups of a compound in which diethylene glycol is linearly oligomerized via a carbonate bond are replaced with allyl carbonate groups);
(4) oligomer including only hydrocarbons derived from neopentyl glycol (a compound having a structure in which two hydroxyl groups of a compound in which neopentyl glycol is linearly oligomerized via a carbonate bond are replaced with allyl carbonate groups);
(5) complex oligomer including both hydrocarbons (and ethers) derived from diethylene glycol and a hydrocarbon derived from neopentylglycol in the same molecule (a compound having a structure in which two hydroxyl groups of a compound in which diethylene glycol and neopentyl glycol are linearly oligomerized in an arbitrary sequence in the same molecule via a carbonate bond are replaced with allyl carbonate groups).

The following are preferable examples of the allyl carbonate polymerizable compound (A1) suitable for the purposes of the present invention:
(i) Mixture with diethylene glycol bis(allyl carbonate) and oligomers thereof, where diethylene glycol bis (allyl carbonate) can be defined by Formula (I)

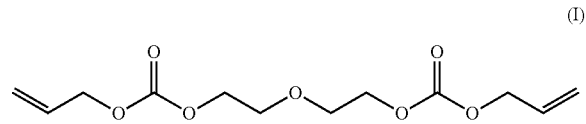 [SMILES: C=CCOC(=O)OCCOCCOC(=O)OCC=C]

In addition, it is possible to define an oligomer of diethylene glycol bis(allyl carbonate) by Formula (II).

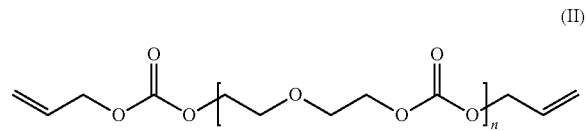

wherein, in the formula (II), n is equal to or more than 1 and equal to or less than 10.

It is possible to manufacture compound (I) by reacting diethylene glycol bis (chloroformate) with allyl alcohol as described in, for example, "Encyclopedia of Chemical Technology", Kirk-Othmer, Third Edition, Volume 2, pages 111-112. It is possible to easily produce mixtures of diethylene glycol-bis(allyl carbonate) (Formula (I)) and an oligomer (Formula (II)) thereof by ester replacement between diallyl carbonate and diethylene glycol in the presence of a basic catalyst, for example, as described in EP 35304. These mixtures usually include up to approximately 80% by weight of oligomers;

(ii) Mixture of bis(allyl carbonate) compound of a mixture of diethylene glycol and neopentyl glycol with oligomers thereof. This bis (allyl carbonate) compound is the same as the bis (allyl carbonate) compound of point (i) above except that diethylene glycol is replaced with a mixture of diethylene glycol and neopentyl glycol;

(iii) Mixture of poly(allyl carbonate) compound of a mixture of diethylene glycol and tris (hydroxyethyl) isocyanurate with oligomers thereof It is possible to obtain the poly(allyl carbonate) compound by ester replacement of a diallyl carbonate of a mixture of diethylene glycol and tris(hydroxyethyl) isocyanurate, for example, as described in U.S. Pat. No. 4,812,545.

(iv) Mixture of poly(allyl carbonate) compound of a mixture of diethylene glycol and trimethylolpropane with oligomers thereof.

This poly(allyl carbonate) compound is the same as the poly(allyl carbonate) compound of point (iii) above, except that tris(hydroxyethyl) isocyanurate is replaced with trimethylol propane.

(v) Mixture of poly(allyl carbonate) compound of a mixture of diethylene glycol and pentaerythritol with oligomers thereof.

This poly(allyl carbonate) compound is the same as the poly(allyl carbonate) compound of point (iii) above, except that tris(hydroxyethyl) isocyanurate is replaced with pentaerythritol.

(vi) Mixture of poly(allyl carbonate) compound of a mixture of diethylene glycol, neopentyl glycol, and pentaerythritol with oligomers thereof.

This poly(allyl carbonate) compound is the same as the poly(allyl carbonate) compound of point (v) above, except that diethylene glycol is replaced with two kinds of diols of diethylene glycol and neopentyl glycol.

(vii) Poly(allyl carbonate) mixture including a mixture of poly(allyl carbonate) compound of a mixture of diethylene glycol, neopentyl glycol, and pentaerythritol with oligomers thereof and a mixture of diethylene glycol bis(allyl carbonate) compound with oligomers thereof.

Allyl Ester Polymerizable Compound (A2), Polymerizable Compound (A3) Examples of the allyl ester polymerizable compound (A2) include diallyl phthalate represented by General Formula (3) and oligomers thereof, and allyl ester compounds represented by General Formula (4) and oligomers thereof obtained by transesterification reaction of a mixture of diallyl phthalate and a polyol. Examples of the polymerizable compound (A3) include a polymerizable compound represented by General Formula (5) including at least one of an allyl ester group and an allyl carbonate group and oligomers thereof.

The polymerizable compound represented by General Formula (5) includes a mixture of an allyl ester compound, an allyl carbonate compound, and compounds having an allyl ester group and an allyl carbonate group, obtained by transesterification reaction of a mixture of dialkyl phthalate, allyl alcohol, diallyl carbonate, and a polyol.

In the present embodiment, the compounds of general Formulas (3) to (5) include regioisomers.

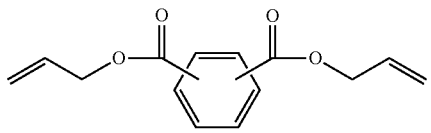

The diallyl phthalate represented by General Formula (3) is at least one kind selected from diallyl isophthalate, diallyl terephthalate, and diallyl orthophthalate.

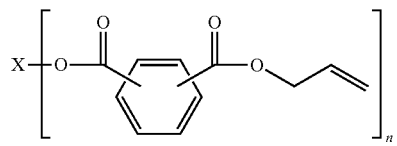

In Formula (4), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6.

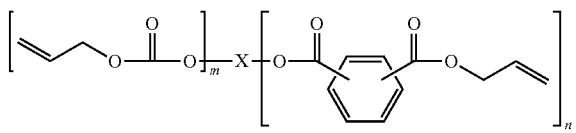

In Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6.

Specific examples of the polyol (aliphatic diol, aliphatic polyol) forming X in Formula (4) and Formula (5) include diols of ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, and 1,4-dimethylolcyclohexane; triols of glycerol and trimethylolpropane; and polyols of tris(hydroxyethyl) isocyanurate, pentaerythritol, digylcerol, ditrimethylol propane, and dipentaerythritol.

It is possible for the compounds of Formula (4) and Formula (5) to include oligomers thereof. The oligomer in Formula (4) is produced by transesterification reaction of an allyl ester compound produced in a production step and a polyol. The oligomer in Formula (5) is produced by transesterification reaction of the allyl ester compound or the allyl carbonate compound produced in the production step and the polyol.

Accordingly, the allyl ester polymerizable compound (A2) or the polymerizable compound (A3) includes at least one kind selected from, for example, a diallyl phthalate compound selected from diallyl isophthalate, diallyl terephthalate, and diallyl orthophthalate; diallyl ester compounds and oligomers thereof obtained by transesterification reaction between the diallyl phthalate compound and a mixture of at least one kind of diol selected from ethylene glycol, diethylene glycol, dipropylene glycol, triethylene glycol, tetraethylene glycol, 1,2-propanediol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and the like; a polyallyl ester compound and an oligomer thereof obtained by transesterification reaction between the diallyl phthalate and a mixture of at least one kind of polyol selected from triols of glycerol and trimethylolpropane, tris(hydroxyethyl) isocyanurate, pentaerythritol, diglycerol, ditrimethylol propane, dipentaerythritol, and the like; and an allyl ester compound, an allyl carbonate compound, a compound having an allyl carbonate group and an allyl ester group, and oligomers thereof, obtained by transesterification reaction of a mixture of at least one kind of dialkyl phthalate having 1 to 3 carbon atoms selected from dimethyl isophthalate, dimethyl terephthalate, dimethyl orthophthalate, diethyl isophthalate, diethyl terephthalate, diethyl orthophthalate, dipropyl isophthalate, dipropyl terephthalate, and dipropyl orthophthalate, an allyl alcohol, diallyl carbonate, and the diol or polyol described above.

More specifically, the allyl ester polymerizable compound (A2) or the polymerizable compound (A3) preferably includes at least one kind selected from (i) a mixture of diallyl terephthalate and a diethylene glycol bis (allyl carbonate) compound at 30% by weight with respect to the diallyl terephthalate and an oligomer thereof, (ii) an allyl ester compound obtained by transesterification reaction of a mixture of diallyl terephthalate and propylene glycol; (iii) a mixture of the allyl ester compound of (ii) and a diethylene glycol bis(allyl carbonate) compound at 20% by weight with respect to the allyl ester compound and an oligomer thereof; (iv) a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol, and (v) a mixture of the mixture obtained in (iv) and a diethylene glycol bis (allyl carbonate) compound at 10% by weight with respect to the mixture and an oligomer thereof.

The following are preferable examples of the allyl ester polymerizable compound (A2) or the polymerizable compound (A3) suitable for the purposes of the present invention: a mixture of an allyl ester compound, an allyl carbonate compound, and a compound having an allyl ester group and an allyl carbonate group, obtained by transesterification reaction of a mixture of dimethyl terephthalate, allyl alcohol, diallyl carbonate, and diethylene glycol.

It is possible for the allyl ester polymerizable compound (A2) or the polymerizable compound (A3) described above to be defined by the Formulas (III) to (V), the diallyl terephthalate of Formula (III) is the main component thereof, and each includes an oligomer obtained by transesterification reaction with a polyol.

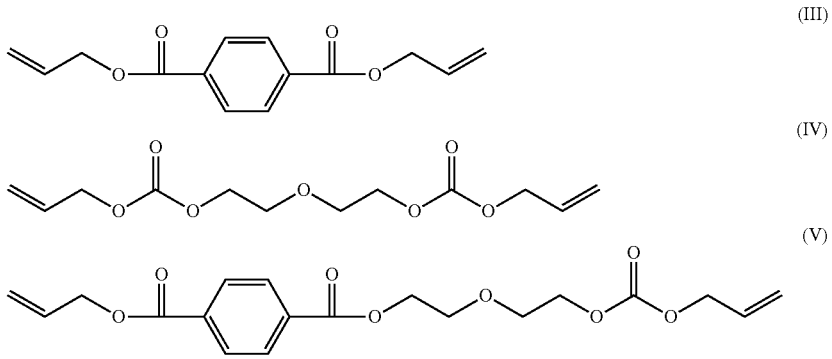

According to the present invention, it is possible to select the compound (A) including two or more allyloxycarbonyl groups as a mixture of the allyl ester polymerizable compound (A2) and/or the polymerizable compound (A3) and oligomers thereof with the allyl carbonate polymerizable compound (A1) and an oligomer thereof.

(D) Ultraviolet Absorbing Agent (UV Absorber)

Preferably the UV absorbing agent is a compound represented by General Formula (i):

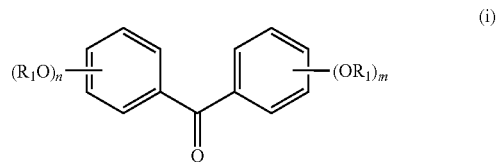

wherein, $R_1$ indicates a hydrogen atom, or a linear or branched alkyl group having 1 to 20 carbon atoms, a plurality of present $R_1$'s may be the same or different;

m is an integer of 1 to 5, preferably an integer of 1 to 3, n is an integer of 1 to 5, preferably an integer of 1 to 3, and the sum of m and n is an integer of 2 to 10, preferably an integer of 3 to 6.

In the formula (i), $R_1$ is preferably a linear or branched alkyl group having 1 to 20 carbon atoms such as a hydrogen atom, a methyl group, an ethyl group, a propyl group, an isopropyl group, a butyl group, an isobutyl group, a sec-butyl group, a tert-butyl group, a pentyl group, a hexyl group, a heptyl group, an octyl group, a 2-ethyl hexyl group, a nonyl group, and a decyl group, and particularly preferably a hydrogen atom, a methyl group, an ethyl group, and a propyl group.

Examples of such an ultraviolet absorbing agent (B) include: 2,2',4-trihydroxybenzophenone, 2,2'-dihydroxy-4-methoxybenzophenone, 2,2'-dihydroxy-4-ethoxybenzophenone, 2,2'-dihydroxy-4-n-propoxybenzophenone, 2,2'-dihydroxy-4-isopropoxybenzophenone, 2,2'-dihydroxy-4-n-butoxybenzophenone, 2,2'-dihydroxy-4-t-butoxybenzophenone, 2-hydroxy-4,4'-dimethoxybenzophenone, 2-hydroxy-4,4'-diethoxybenzophenone, 2-hydroxy-4,4'-di-n-propoxybenzophenone, 2-hydroxy-4,4'-diisopropoxybenzophenone, 2-hydroxy-4,4'-di-n-butoxybenzophenone, 2-hydroxy-4,4'-di-t-butoxybenzophenone, 2-hydroxy-4-methoxy-4'-ethoxybenzophenone, 2-hydroxy-4-methoxy-4'-n-propoxybenzophenone, 2-hydroxy-4-methoxy-4'-isopropoxybenzophenone, 2-hydroxy-4-methoxy-4'-n-butoxybenzophenone, 2-hydroxy-4-methoxy-4'-t-butoxybenzophenone, 2-hydroxy-4-ethoxy-4'-methoxybenzophenone, 2-hydroxy-4-ethoxy-n-propoxybenzophenone, 2-hydroxy-4-ethoxy-4'-isopropoxybenzophenone, 2-hydroxy-4-ethoxy-4'-n-butoxybenzophenone, 2-hydroxy-4-ethoxy-4'-t-butoxybenzophenone, 2-hydroxy-4-n-propoxy-4'-methoxybenzophenone, 2-hydroxy-4-n-propoxy-4'-ethoxybenzophenone, 2-hydroxy-4-n-propoxy-4'-isopropoxybenzophenone, 2-hydroxy-4-n-propoxy-4'-n-butoxybenzophenone, 2-hydroxy-4-n-propoxy-4'-t-butoxybenzophenone, 2-hydroxy-4-isopropoxy-4'-methoxybenzophenone, 2-hydroxy-4-isopropoxy-4'-ethoxybenzophenone, 2-hydroxy-4-isopropoxy-4'-n-propoxybenzophenone, 2-hydroxy-4-isopropoxy-4'-n-butoxybenzophenone, 2-hydroxy-isopropoxy-4'-t-butoxybenzophenone, 2-hydroxy-4-n-butoxy-4'-methoxybenzophenone, 2-hydroxy-4-n-butoxy-4'-ethoxybenzophenone, 2-hydroxy-4-n-butoxy-4'-n-propoxybenzophenone, 2-hydroxy-4-n-butoxy-4'-isopropoxybenzophenone, 2-hydroxy-4-n-butoxy-4'-t-butoxybenzophenone, 2-hydroxy-4-t-butoxy-4'-methoxybenzophenone, 2-hydroxy-4-t-butoxy-4'-ethoxybenzophenone, 2-hydroxy-4-t-butoxy-4'-n-propoxybenzophenone, 2-hydroxy-4-t-butoxy-4'-isopropoxybenzophenone, 2-hydroxy-4-t-butoxy-4'-n-butoxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-di-n-propoxybenzophenone, 2,2'-dihydroxy-4,4'-di-iso-propoxybenzophenone, 2,2'-dihydroxy-4,4'-di-n-butoxybenzophenone, 2,2'-dihydroxy-4,4'-di-t-butoxybenzophenone, 2,2'-dihydroxy-4-methoxy-4'-diethoxybenzophenone, 2,2'-dihydroxy-4-methoxy-4'-propoxybenzophenone, 2,2'-dihydroxy-4-methoxy-4'-isopropoxybenzophenone, 2,2'-dihydroxy-4-methoxy-4'-n-butoxybenzophenone, 2,2'-dihydroxy-4-methoxy-4'-t-butoxybenzophenone, 2,2'-dihydroxy-4-ethoxy-4'-n-propoxybenzophenone, 2,2'-dihydroxy-4-ethoxy-4'-isopropoxybenzophenone, 2,2'-dihydroxy-4-ethoxy-4'-n-butoxybenzophenone, 2,2'-dihydroxy-4-ethoxy-4'-t-butoxybenzophenone, 2,2'-dihydroxy-4-n-propoxy-4'-isopropoxybenzophenone, 2,2'-dihydroxy-4-n-propoxy-4'-n-butoxybenzophenone, 2,2'-dihydroxy-4-n-propoxy-4'-t-butoxybenzophenone, 2,2'-dihydroxy-4-isopropoxy-4'-n-butoxybenzophenone, 2,2'-dihydroxy-4-isopropoxy-4'-t-butoxybenzophenone, 2,2'-dihydroxy-4-n-butoxy-4'-t-butoxybenzophenone, 2,2',4-trimethoxybenzophenone, 2,2',4-triethoxybenzophenone, 2,2',4-tri-n-propoxybenzophenone, 2,2',4-triisopropoxybenzophenone, 2,2',5-trimethoxybenzophenone, 2,2',5-triethoxybenzophenone, 2,2',5-tri-n-propoxybenzophenone, 2,2',5-triisopropoxybenzophenone, 2,4,4'-trimethoxybenzophenone, 2,4,4'-triethoxybenzophenone, 2,4,4'-tri-n-propoxybenzophenone, 2,4,4'-triisopropoxybenzophenone, 3,4',5-trimethoxybenzophenone, 3,4',5-triethoxybenzophenone, 3,4',5-tri-n-propoxybenzophenone, 3,4',5-triisopropoxybenzophenone, 2,4-dimethoxy-4'-hydroxybenzophenone, 2,4-diethoxy-4'-hydroxybenzophenone, 2,4-di-n-propoxy-4'-hydroxybenzophenone, 2,4-diisopropoxy-4'-hydroxybenzophenone, 2,2',4,4'-tetramethoxybenzophenone, 2,2',4,4'-tetraethoxybenzophenone, 3,3',4,4'-tetramethoxybenzophenone, 3,3',4,4'-tetraethoxybenzophenone, 2,3,3',4'-tetramethoxybenzophenone, 2,3,3',4'-tetraethoxybenzophenone, and the like.

Among these, 2,2'-dihydroxy-4-methoxybenzophenone, 2,2'-dihydroxy-4,4'-dimethoxybenzophenone, and 2,2',4,4'-tetrahydroxybenzophenone are particularly preferable.

It is possible to use the ultraviolet absorbing agent (D) in an amount of 0.05% to 5% by weight, preferably 0.5% to 3% by weight, with respect to the total weight of the polymerizable component (AA) of the polymerizable composition. Within this range, it is possible to more effectively exhibit the effect of blocking light between harmful ultraviolet light and blue light of approximately 420 nm.

Compound (E) Radical Polymerization Initiator

According to the present invention, the polymerizable composition includes at least one radical polymerization initiator for either thermal or photoinitiation.

Preferably, the radical initiator is an organic peroxide compound.

The radicalic initiator is preferably selected from:
peroxymonocarbonate esters (e.g. tert-butyl peroxyisopropyl carbonate);
peroxydicarbonate esters (e.g. di(2-ethylhexyl) peroxydicarbonate, cyclohexyl peroxydicarbonate, di(cyclohexyl) peroxydicarbonate, di(sec-butyl) peroxydicarbonate and diisopropyl peroxydicarbonate,
diacylperoxides (e.g. 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide);
peroxyesters (e.g. t-butylperoxy pivalate, t-butylperoxy octylate and t-butylperoxy butyrate); and mixtures thereof.

The initiator is more preferably selected from: peroxymonocarbonate esters, peroxydicarbonate esters, diacyl peroxides and mixtures thereof.

Preferred peroxymonocarbonate esters and peroxy-dicarbonate esters are those having the following formulae (F1) and (F2)

$$R_1-O-O-\overset{O}{\overset{\|}{C}}-O-R_2 \qquad (F1)$$

$$R_1-O-\overset{O}{\overset{\|}{C}}-O-O-\overset{O}{\overset{\|}{C}}-O-R_2 \qquad (F2)$$

wherein $R_1$ and $R_2$, the same or different, are selected from: $C_1$-$C_{20}$ alkyl, $C_1$-$C_{20}$ alkenyl or $C_1$-$C_{20}$ cycloalkyl.

$R_1$ and $R_2$ preferably have from 2 to 16 carbon atoms, more preferably from 3 to 7 carbon atoms.

$R_1$ and $R_2$ can be linear or branched, and possibly substituted (for example with at least one halogen atom (e.g. Cl or Br) or a $NO_2$ group).

Examples of $R_1$ and $R_2$ groups are: methyl, ethyl, n-propyl, isopropyl, n-butyl, sec-butyl, isobutyl, and hexyl.

The use amount of the radical polymerization initiator (E) varies depending on the polymerization conditions, the kind of initiator, the purity of the initiator, the diluent used, and the composition of the compound (A) and is generally not limited; however, the use amount is 0.1% to 5.0% by weight, preferably 0.5% to 3.5% by weight, with respect to the total weight of the polymerizable component (A) of the polymerizable composition and it is also possible to use a combination of two or more kinds of radical polymerization initiator.

In an embodiment, the radical polymerization initiator is used in the form of a masterbatch composition, i.e. it is pre-dispersed in a polymerizable monomer such as any of the allyl-based polymerizable compounds of component (A) comprising two allyloxy groups described in the present disclosure, prior to be incorporated into the polymerizable composition.

In addition, when polymerizing the polymerizable composition for an optical material of the present embodiment, among the polymerization conditions, the temperature particularly affects the properties of the obtained cured product. Since this temperature condition is influenced by the kind and amount of the radical polymerization initiator (E) and the kind of the monomer (i.e, the polymerizable component (A)), it is generally not possible to limit the condition; however, in general, it is preferable that the polymerization be started at a relatively low temperature, that the temperature be slowly raised, and that curing be carried out at a high temperature when finishing the polymerization. Since the polymerization time also varies depending on various factors in the same manner as the temperature, the optimum time is suitably determined in advance according to these conditions, but it is generally preferable to choose the conditions such that the polymerization is completed in 12 to 24 hours. In addition, the polymerizable composition for an optical material of the present embodiment has a high yield rate since not requiring strict control to 35 degree C. or lower and being curable even in a pattern of starting from 60 degree C. or higher Other Components The bleaching agent and the polymerizable composition may also include further additive compounds such as an internal release agent, a resin modifier (e.g. a chain extender, a cross-linking agent, a light stabilizer), an antioxidant, filler, adhesion improver, and the like.

As the internal release agent, for example, it is possible to use an acidic phosphate ester or a nonreactive silicone oil. Examples of acidic phosphate esters include phosphoric monoesters and phosphoric diesters and it is possible to use the above alone or in a mixture of two or more kinds.

Examples of resin modifiers include an olefin compound including an episulfide compound, an alcohol compound, an amine compound, an epoxy compound, an organic acid and an anhydride thereof, a (meth)acrylate compound, and the like.

Use of the Bleaching Agent

The amount of bleaching agent composition that is added to the polymerizable composition depends on the desired cut-off value for the moulded product, and thus on the concentration of UV absorber in the polymerizable composition.

The bleaching agent composition is preferably added to the polymerizable composition in an amount within the range of from 0.01% to 5.0% by weight, more preferably from 0.02% to 1.5% by weight, based on the weight of the polymerizable component (A) of the polymerizable composition (not including the amount of polymerizable component (A) of the bleaching agent).

Method for Producing the Bleaching Agent

In an embodiment, the preparation of the bleaching agent includes at least a step of mixing the component (A), the pigment particles of colouring component (B) and the polymeric dispersing agent (C) to obtain a liquid pre-mixture, followed by a step of homogenizing the pre-mixture to obtain a bleaching agent wherein the dispersed pigment particles (b1) and optionally (b2) have an average particle size equal to or lower than 400 nm.

In the preparation of the bleaching agent, the homogenization step of the pre-mixture allows to achieve either or both of: (a) reduction of the average pigment particles size; (b) a more uniform distribution of the pigment particle size within the polymer component (A), namely a relatively narrow distribution of the pigment particle size around its mean value.

Homogenization can be achieved by the action of shearing forces, which can be applied to the pre-mixture by a variety of techniques, such as: mechanical agitation; by forcing the pre-mixture to flow at very high velocity through a narrow passage; by shearing the pre-mixture between two surfaces moving one with respect to the other or by ultrasonic vibrations.

In a preferred embodiment, homogenization is accomplished using a high-pressure homogenizer. High-pressure homogenization (HPH) is a milling technique that allows to comminute solid particles dispersed in a fluid. HPH is widely used in a variety of technical fields, such as food industry and biotechnology, e.g. for the production of fine emulsions or the disruption of microorganisms, targeting either their inactivation or the release of intracellular products.

A high-pressure homogenizer works by forcing the suspension to be homogenized, i.e. the pre-mixture containing the pigment particles, through a very narrow channel or orifice under pressure. In general, a suitable homogenizer comprises a high-pressure pump and homogenizing head. The pump may be a positive displacement reciprocating (piston) pump. The high-pressure applied is preferably a pressure within the range of from 20 to 70 MPa. The homogenizing head may house a narrow gap assembly (homogenizing valve) which may come in different forms, according to design. The head may contain, for example, one valve (single-stage homogenization) or two valves in series (two-stage homogenization).

Subsequently, and depending on the type of high-pressure homogenizer device, the suspension may or may not impinge at high velocity on a hard-impact ring or against another high-velocity stream of the same dispersion coming from the opposite direction. Comminution of the pigment particles is achieved by collisions of the particles with each other and with the homogenizer, respectively, and by cavitation.

In another preferred embodiment, homogenization of the pre-mixture is accomplished by means of an ultrasonic homogenizer.

Ultrasonic homogenizers exploit acoustic waves in the frequency range of 20-30 kHz to comminute the pigment particles suspended in the allyl resin. The mechanisms of action include compression-expansion cycles and cavitation. The vibrations are applied to the liquid pre-mixture by an immersed probe (or horn).

A suitable ultrasonic dispersion equipment normally includes: an ultrasonic generator, an ultrasonic transducer (converter) and a sonotrode (also referred to as probe or horn). The ultrasonic generator (power supply) generates electrical oscillations of ultrasonic frequency. The ultrasonic transducer converts the electrical oscillations generated by the generator into mechanical vibrations, which are then transmitted to the material to be sonicated (i.e. the bleaching agent) through the sonotrode. At the sonotrode surface, the mechanical vibrations are coupled to the bleaching agent (i.e. the liquid pre-mixture) resulting in the formation of microscopic bubbles (cavities) within the liquid that expand during low pressure cycles and implode violently during high pressure cycles. This phenomenon, which is termed cavitation, generates high shear forces at the sonotrode tip and causes the exposed liquid to become intensely agitated.

In an embodiment, the sonotrode can be immersed directly in the container hosting the bleaching agent mixture. In another embodiment, a recirculation system can be used, in which the bleaching agent mixture is continuously recirculated, by means of a pump, through a flow cell where the sonotrode lies immersed within the flowing liquid.

It has been found that the level of dispersibility of the pigment particles in the polymerizable component (A), as measurable for example by the PDI value of the pigment in the bleaching agent or polymerizable composition influences the bleaching performance of the bleaching agent.

In an embodiment, the maximum value of the PDI of the pigment component (B) in the bleaching agent or polymerizable composition is equal to or lower than 0.25, preferably equal to or lower than 0.20, even more preferably equal to or lower than 0.15.

In an embodiment, the minimum value of the PDI of the pigment component (B) in the bleaching agent or polymerizable composition is preferably equal to or higher than 0.05, more preferably equal to or higher than 0.10.

The PDI value may also be within any interval that is a combination of any of the above PDI values.

Method for Producing the Polymerizable Composition for an Optical Material

It is possible to prepare the polymerizable composition for an optical material according to the present invention by mixing the following as a batch: a component (AA) comprising a compound including two or more allyloxycarbonyl groups, an ultraviolet absorbing agent (D), a radical polymerization initiator (E), and at least one bleaching agent including a pigmenting component (B) comprising particles of a blue pigment (b1) and optionally of a pigment (b2) as described above.

The mixing of the above components to prepare a polymerizable composition is usually carried out at a temperature of 25 degree C. or lower. From the viewpoint of the pot life of the polymerizable composition, it may be preferable to further lower the temperature. However, in a case where the solubility of a catalyst, an internal release agent, and an additive in the monomer (i.e. polymerizable component) is not good, it is also possible to previously heat and dissolve the above in the monomer and the resin modifier.

In the present embodiment, the method for producing the resin molded article is not particularly limited, but examples of preferable production methods include cast polymerization. First, a polymerizable composition is injected to a space between two molds held by a gasket, a tape, or the like. At this time, depending on the physical properties required for the plastic lens to be obtained, in many cases, it is preferable to carry out degassing treatment under reduced pressure, a filtration treatment such as pressurization and depressurization, and the like as necessary.

Since the polymerization conditions vary greatly depending on the composition of the polymerizable composition, the type and amount of the peroxide initiator used, the shape of the mold, and the like, the conditions are not limited, but the above are performed for approximately 1 to 50 hours at a temperature of 0 to 150 degree C. In some cases, it is preferable to carry out the curing while holding in a temperature range of 20 to 130 degree C., or gradually raising the temperature, for 1 to 48 hours.

The resin molded article may be subjected to a treatment such as annealing as necessary. The treatment temperature is usually performed at 50 to 150 degree C., but is preferably performed at 90 to 140 degree C., and more preferably performed at 100 to 130 degree C.

In the present embodiment, when molding the resin, in addition to the above-mentioned "other components", in accordance with the purpose, in the same manner as known molding methods, various additives such as a chain extender, a cross-linking agent, a light stabilizer, an antioxidant, oil soluble dye, filler, adhesion improver, and the like may be added.

Use

It is possible to produce the poly(allyl carbonate) and poly(allyl ester) resins, obtained from the polymerizable composition for an optical material of the present description, as molded articles of various shapes by changing the type of mold during cast polymerization.

The molded article of the present invention has a superior effect of blocking light between harmful ultraviolet light and blue light, has an excellent colorless, transparent, external appearance, and is capable of being used for various optical materials such as plastic lenses. In particular, it is possible to suitably use the resin molded article as a plastic spectacle lens.

In particular, the moulded articles according to the present invention may have a light cut off at a wavelength of 413 nm or lower, such as a wavelength of 410 nm, 405 nm or 400 nm.

Preferably, the moulded articles according to the present invention have a haze value, measured in accordance with ASTM D 1003, equal to or lower than 1.5%, more preferably equal to or lower that 1%.

Preferably, the resin moulded articles according to the present invention have a refractive index, measured in accordance with ASTM D542, equal to or lower than 1.600, preferably within the range 1.560 to 1.500.

Plastic Spectacle Lens

The plastic spectacle lens using the lens base material including the molded article of the present invention may be used after application of a coating layer on one surface or both surfaces thereof as necessary.

The plastic spectacle lens of the present embodiment includes a lens base material including the polymerizable composition described above and a coating layer.

Specific examples of the coating layer include a primer layer, a hard coat layer, an anti-reflection layer, an anti-fog coating layer, an anti-fouling layer, a water repellent layer, and the like. It is also possible to use each of these coating layers alone, or to use a plurality of coating layers in multiple layers. In a case of applying coating layers on both surfaces, the same coating layer may be applied to each side or different coating layers may be applied to each side.

In each of these coating layers, an infrared absorber for the purpose of protecting eyes from infrared rays, a light stabilizer, an antioxidant, and a photochromic compound for the purpose of improving the weather resistance of the lens, and a dye or a pigment for the purpose of improving the fashionability of the lens, an antistatic agent, and other known additives for enhancing the performance of the lens may be used in combination.

Various levelling agents for the purpose of improving applicability may be used for layers to be coated by application.

The primer layer is usually formed between a hard coat layer described below and a lens. The primer layer is a coating layer for the purpose of improving the adhesion between the hard coat layer formed thereon and the lens, and in some cases, it is also possible to improve the impact resistance. It is possible to use any material as the primer layer as long as the material has high adhesion to the obtained lens, but in general, a primer composition mainly formed of a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is possible to form the primer layer by either a coating method or a dry method. In a case of using a coating method, a primer layer is formed by applying the primer composition to a lens by a known coating method such as spin coating, dip coating, or the like and then solidifying the primer composition. In a case where the drying method is used, the primer layer is formed by a known dry method such as a CVD method or a vacuum deposition method. When forming the primer layer, the surface of the lens may be subjected to a pretreatment such as an alkali treatment, a plasma treatment, an ultraviolet treatment, and the like as necessary for the purpose of improving the adhesion.

The hard coat layer is a coating layer for the purpose of imparting functions such as scratch resistance, abrasion resistance, moisture resistance, hot water resistance, heat resistance, weather resistance, and the like to the lens surface.

Generally, for the hard coat layer, a hard coat composition including an organosilicon compound having curability and one or more kinds of oxide fine particles of elements selected from the element group of Si, Al, Sn, Sb, Ta, Ce, La, Fe, Zn, W, Zr, In, and Ti and/or one kind or more of fine particles formed of composite oxides of two or more kinds of elements selected from this group of elements is used.

In addition to the above components, it is preferable for the hard coat composition to include at least one of amines, amino acids, metal acetylacetonate complexes, metal salts of organic acids, perchloric acids, salts of perchloric acids, acids, metal chlorides, and polyfunctional epoxy compounds. The hard coat composition may be used with an appropriate solvent which does not affect the lens or may be used without solvent.

The hard coat layer is usually formed by applying a hard coat composition by a known coating method such as spin coating or dip coating and then curing the composition. Examples of curing methods include heat curing and a method of curing by energy ray irradiation such as ultraviolet ray or visible light. In order to suppress the occurrence of interference fringes, it is preferable that the difference in refractive index of the hard coat layer and the lens be within a range of −0.1 to +0.1.

The antireflection layer is usually formed on the hard coat layer as necessary. There are organic type and inorganic type antireflection layers and, in the case of an inorganic type, inorganic oxides such as SiO2, TiO2, and the like are used, and the antireflection layer is formed by a dry method such as a vacuum deposition method, a sputtering method, an ion plating method, an ion beam assist method, a CVD method or the like. In the case of an organic type, the antireflection layer is formed by a wet process using a composition including an organosilicon compound and silica-based fine particles having an internal cavity.

There are single layer and multiple-layer antireflection layers, and in the case of use as a single layer, it is preferable that the refractive index be lower than the refractive index of the hard coat layer by at least 0.1. In order to effectively exhibit the antireflection function, it is preferable to form a multilayer antireflection film, in which case a low refractive index film and a high refractive index film are alternately laminated. Also in this case, the refractive index difference between the low refractive index film and the high refractive index film is preferably 0.1 or more. Examples of high refractive index films include films of ZnO, TiO, $CeO_2$, $Sb_2O_5$, $SnO_2$, $ZrO_2$, $Ta_2O_5$, and the like, and examples of low refractive index films include SiO2 films and the like.

On the antireflection layer, an antifogging layer, an antifouling layer, a water repellent layer may be formed, as necessary. The method for forming the antifogging layer, the antifouling layer, and the water repellent layer is not particularly limited as long as there is no adverse effect on the antireflection function, the processing method, the processing material, and the like are not particularly limited and it is possible to use known antifogging treatment methods, antifouling treatment methods, water repellent treatment methods, and materials. Examples of antifogging treatment methods and antifouling treatment methods include a method of covering the surface with a surfactant, a method of adding a hydrophilic film to the surface to impart water absorbency, a method of covering the surface with fine irregularities to increase the water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

EXAMPLES

A specific description will be given below of the present invention based on examples, but the present invention is not limited to these examples.

Characterization Methods The moulded articles comprising the cured resin were evaluated by the following methods.

Resin Yellowness Index (YI) (ASTM D-1925): the YI was determined with a GretagMacbeth 1500 Plus spectrophotometer. The YI is defined as: YI=100/Y (1.277X−1.06Z).

Light cut off ratio at a given wavelength: The transmittance at a given wavelength (e.g. 400 nm, 405 nm, 410 nm) of the moulded article in the form of a flat plate having a thickness of 2 mm was measured with an UV-Visible spectrophotometer Hewlett-Packard 8453. The light cut off ratio at a given wavelength, for example 400 nm, is defined by the following formula:

Cut Off ratio$_{(400)}$%=100(%)−Transmittance (%) at 400 nm

Haze value: The obtained moulded article in the form of a flat plate having a thickness of 2 mm was measured for haze in accordance with ASTM D 1003 with a digital haze meter haze-gard plus manufactured by BYK-Gardner.

Total light transmittance: The obtained moulded article in the form of a flat plate having a thickness of 2 mm was measured for total light transmittance in accordance with ASTM D 1003 with a digital haze meter haze-gard plus manufactured by BYK-Gardner.

Particle size and polydispersity index (PDI): Particles size and PDI of the pigments dispersed in the bleaching agent were measured by DLS technique according to ISO 22412: 2017 using a Zetasizer Nano ZS instrument manufactured by Malvern Panalytical. For the measurement, the bleaching agent was diluted 1/250 (vol/vol) in RAV 755-T monomer. The temperature of the measurement chamber was kept at 60 degree C.

Mechanical Properties

The following parameters were evaluated on a moulded article in the form of a flat plate having a thickness of 2 mm:

The following parameters were evaluated on a 2 mm-thick plano lens:
(a) Indentation hardness (ASTM D-785) by means of a Rockwell durometer, scale M;
(b) Tintability. The capacity of the polymerized product of superficially adsorbing a colouring agent was determined by immersing a neutral lens in an aqueous bath in which the commercial dye BPI gray diluted at 10% by weight in demineralized water, was dispersed. The lens was immersed in the tinting bath for 20 minutes at a temperature of 90 degree C. After rinsing with demineralized water, the Transmittance % of the lens was determined under the terms of the standard ASTM D-1003;
(c) Abrasion resistance with Bayer Scratch Test (ASTM F-735). The capacity of the polymerized product of resisting surface abrasion was determined with a Taber oscillating abrasimeter, according to the method ASTM F-735. This method involves contemporaneously subjecting the sample lens and a reference lens made of diethylene glycol bis(allyl carbonate) (CR39) to 600 oscillating cycles with the abrasive material Alundum ZF-12.

The ratio between the increase in Haze measured with the instrument Haze-gard plus according to ASTM D-1003 after the abrasion cycles on the sample lens and on the reference lens represents the Bayer abrasion resistance value (BA).

$$\text{Bayer Abrasion} = \frac{\Delta \text{ Haze (reference lens)}}{\Delta \text{ Haze (sample lens)}}$$

Values of the BA index higher than 1 indicate an abrasion resistance higher than that of the reference material; values of the BA index lower than 1 indicate an abrasion resistance lower than that of the reference material.

Chemicals Used in the Examples

In the Examples, the following components were used.
Polymerizable Component
RAV 755-T, a mixture of an allyl ester compound, an allyl carbonate compound, and compounds having an allyl ester group and an allyl carbonate group, obtained by ester replacement of a mixture of dimethyl terephthalate, allyl alcohol, diallyl carbonate, and diethylene glycol, manufactured by Acomon;

RAV 7AT, aliphatic poly(allyl carbonate) compound of diethylene glycol and pentaerythritol, and oligomers thereof, manufactured by Acomon;
RAV 7AX, aliphatic poly(allyl carbonate) compound of diethylene glycol and pentaerythritol, with higher oligomeric content with respect to RAV 7AT, manufactured by Acomon.

Pigments
Ultramarine Blue (Pigment Blue 29: 77007 ex Venator); average particle size: 1050 nm;
Hostaperm Blue BT-627-D (Pigment Blue 15:2 manufactured by Clariant); average particle size: 60 nm;
Hostaperm Violet RL-NF (Pigment Violet 23 manufactured by Clariant); average particle size: 45 nm;
Hostaperm Violet ER-02 (Pigment Violet 19 manufactured by Clariant); average particle size: 65 nm;
Hostaperm Red E3B (Pigment Violet 19 (73900) manufactured by Clariant); average particle size: 195 nm;
Hostaperm Pink EB Transp. (Pigment Red 122 manufactured by Clariant); average particle size: 55 nm.

The above average particle sizes are those reported on the technical data sheets of the respective commercial products.
Polymeric Dispersing Agent
Disperbyk 191 manufactured by BYK-Chemie GmbH; Wesel, Germany.
UV absorber
BP6 (2,2'-dihydroxy-4,4'-dimethoxybenzophenone, manufactured by MFCI).
Peroxide radical polymerization initiator
Trigonox ADC-NS30 by Akzo Nobel; this product contains about 70% by weight of diethylene glycol bis (allyl carbonate) and 30% by weight of a mixture of isopropyl, sec-butyl and isopropyl/sec-butyl peroxydicarbonates.

Preparation of the Bleaching Agents A to I

Bleaching agents having the chemical compositions A to I listed in Table 1 were prepared. Each bleaching agent was prepared by weighing the required amount of each component in an HDPE bottle with wide mouth and sealable with a cap to form a pre-mixture.

After being manually shaked, the pre-mixtures were then subjected to one of the following types of homogenization treatment.
i. Indirect sonication (IS): the tightly capped bottle was put in a multifrequency ultrasonic bath manufactured by Sonorex, model DT1028H. The total time of exposure to the ultrasonic treatment (at a temperature of 45-55 degree C.) was 4 hours, with 1-minute manual shaking every hour;
ii. Direct sonication (DS): the mixture was sonicated by means of a sonicator equipment manufactured by Hielscher, model HI UP400ST, equipped with a sonotrode titanium horn, diameter 14 mm, and a flow cell (model FC 22K, volume 13 ml) and fed with a diaphragm pump model KNF N300KT.18. The sonication was carried out in a continuous mode by making the bleaching agent continuously flowing through the flow cell at about 70 degree C. (flow cell rate=3.0 l/min, residence time of the mixture in the cell $T_{RT}$=0.26 seconds, amplitude from 80% to 100%, sonotrode oscillation=150 microns). The total time of exposure of the bleaching agent to the ultrasonic treatment was 4 hours at the maximum sonotrode amplitude;
iii. High-pressure homogenization (HPH): the bleaching agent as prepared according to i was further subjected to high-pressure homogenization by means of Microfluidizer processor, model LM20 manufactured by IDEX Corporation at the following operating conditions: pressure of 30.000 psi, temperature of 10 degree C., total number of 5 cycles (10 minutes). It is noted, however, that a pre-homogenization step according to i, prior to the HPH treatment, is not mandatory as bleaching agents having the same characteristics in terms of average pigment particles size and PDI can be obtained by homogenizing the pre-mixtures directly with the HPH device.

Preparation of the Bleaching Agents K and L
(Comparative Samples)

For comparison purposes, the bleaching agents having the chemical compositions K and L listed in Table 2 were prepared according to the same procedure of the samples A to I. The pre-mixtures were submitted to direct sonication at the conditions described under ii. The stability of the bleaching agents H, K and L were evaluated by visually inspecting the sample to check the occurrence of flocculated or sedimented pigment particles at different times after the preparation (1 week, 2 weeks and 1 month). The samples were evaluated according to the following scale: 0=absent; 1=traces; 2=visible; 3=severe, accompanied by different color of the liquid phase at the top meniscus.

Preparation and Casting of the Polymerizable Compositions

The polymerizable compositions tested in the present disclosure were prepared by adding the UV absorber, in powder form or as a masterbatch, and the polymerization initiator to the polymerizable compound under vigorous stirring.

The masterbatch containing the UV absorber was prepared by adding the UV absorber in powder form to the polymerizable compound A (RAV 755-T) at a concentration of 1.0% or 2.0% by weight based on the weight of the masterbatch. This mixture was then warmed up to 70-80 degree C. under stirring until a clear solution was obtained, and then it was allowed to cool down to ambient temperature.

The bleaching agent was then added to the polymerizable mixture containing the UV absorber and the radical initiator to form the polymerizable composition.

Before casting, the polymerizable composition was vigorously mixed with a magnetic stirrer and degassed for 30 minutes at a pressure between 100-300 mbar. Unless described otherwise, the degassed mixture was filtered on a 5 micrometer PTFE membrane (47 mm diameter) before filling the moulds. Alternative filtration means include polypropylene cartridges, in particular:
  HDCII-DFA cartridges supplied by PALL, having a pleated membrane filtering bed with absolute filtering pore size ranging from 6 to 10 microns;
  Profile Star cartridges supplied by Pall, depth filters with absolute filtering pore size of 5 micron.

The polymerizable compositions were casted and polymerized in the form of lenses having a thickness of 2 mm, by casting in glass moulds. The moulds were made from two glass half-moulds joined together by means of a spacer gasket made of low-density polyethylene (LDPE) to form a cavity suitable for containing the polymerizable composition. In alternative to gaskets, adhesive sealing tapes can be used.

The polymerization was carried out by means of thermal treatment in a forced-air-circulation oven, with a gradual temperature rise as indicated hereunder. At the end of the thermal treatment, the moulds were opened and the lenses were kept at 110 degree C. for 1 hour in order to decompose possible residual amounts of the peroxide initiator.

The polymerizable compositions listed in Tables 3 and 4 having a cut-off (i.e. transmittance T is 1% or less at the indicated wavelength) at the UV wavelengths of 355 nm and 365 nm (UV-cut) and at the HEV wavelengths of 400 nm, 405 nm, and 410 nm (HEV-cut) were prepared.

TABLE 1

| | Bleaching agents A-I | | | | | | |
|---|---|---|---|---|---|---|---|
| Component (%$^a$) | A | B | E | F | G | H | I |
| RAV 755-T | 96.0 | 96.0 | 94.3 | 96.0 | 96.1 | 95.9 | 95.9 |
| Ultramarine Blue | 1.9 | 1.9 | 1.9 | 1.9 | 1.9 | 1.9 | 1.9 |
| Hostaperm Blue BT627D | — | — | — | — | — | — | — |
| Hostaperm Violet RL-NF | — | — | — | — | — | — | — |
| Hostaperm Violet ER-02 | — | — | 1.9 | — | — | — | — |
| Hostaperm Red E3B | 0.2 | — | — | 0.2 | 0.1 | — | — |
| Hostaperm Pink EB T. | — | 0.2 | — | — | — | 0.3 | 0.3 |
| Disperbyk 191 | 1.9 | 1.9 | 1.9 | 1.9 | 1.9 | 1.9 | 1.9 |
| Homogenization | IS | IS | IS | DS | DS | DS | HPH |
| z-average particle size (nm)$^b$ | 440 | 420 | 420 | 280 | 280 | 200 | 160 |
| PDI$^b$ | 0.29 | 0.28 | 0.28 | 0.24 | 0.24 | 0.21 | 0.23 |

$^a$weight percentage of the component based on the weight of the bleaching agent;
$^b$z-average particle size and PDI measured on the bleaching agent composition.

TABLE 2

| | Bleaching agents K and L (comparative) | | |
|---|---|---|---|
| Component (%) $^a$ | H | K* | L* |
| RAV 755-T | 95.9 | — | 97.8 |
| RAV 7AX | — | 95.9 | — |
| Disperbyk 191 | 1.9 | 1.9 | — |
| Ultramarine Blue | 1.9 | 1.9 | 1.9 |
| Hostaperm Pink EB T. | 0.3 | 0.3 | 0.3 |
| z-average particle size (nm) $^b$ | 200 | 220 | 500 |
| PDI $^b$ | 0.21 | 0.21 | 0.15 |
| Stability of the dispersion $^c$ | H | K | L |
| 1 week | 0 | 2 | 1 |
| 2 weeks | 0 | 3 | 3 |
| 1 month | 1 | 3 | 3 |

*comparative samples
$^a$ weight percentage of the component based on the weight of the bleaching agent;
$^b$ z-average particle size and PDI measured on the bleaching agent composition;
$^c$ occurrence of pigments precipitation determined by visual inspection (0 = absent; 1 = traces; 2 = visible; 3 = severe, accompanied by different liquid color at the top meniscus).

TABLE 3

Moulded articles cured in the absence of bleaching agent[a]

| Component %[b] | UV compositions | | HEV compositions | | | | | | |
|---|---|---|---|---|---|---|---|---|---|
| | REF1 | REF2 | 1 | 2 | 3 | 3bis | 4 | 5 | 5bis |
| Cut off (nm) | 355 | 365 | 400 | 400 | 400 | 400 | 405 | 410 | 410 |
| RAV 7AT | 88.96 | — | 88.82 | — | — | — | — | — | — |
| RAV 7AX | — | — | — | 71.0 | — | — | — | — | — |
| RAV 755-T | — | 89.94 | — | — | 89.85 | 82.5 | 89.7 | 89.4 | 60 |
| ADC NS30 | 11.0 | 10.0 | 11.00 | 11.0 | 10.0 | 10.0 | 10.0 | 10.0 | 10 |
| BP6[c] | 0.04 | 0.06 | 0.18 | — | 0.15 | — | 0.3 | 0.6 | — |
| RAV 7AX MBUVA[d] | — | — | — | 18.0 | — | — | — | — | — |
| RAV 755-T MBUVA[e] | — | — | — | — | — | 7.5 | — | — | 30 |
| YI | 0.50 | 3.15 | 4.00 | 4.05 | 5.10 | 5.05 | 6.80 | 10.40 | 10.50 |
| Haze % | 0.28 | 0.30 | 0.31 | 0.28 | 0.34 | 0.33 | 0.34 | 0.30 | 0.28 |
| Total T % | 93.4 | 93.6 | 93.4 | 93.6 | 93.5 | 93.5 | 92.8 | 92.4 | 9.24 |
| T % 400 nm | 90.2 | 68.7 | 0.9 | 0.9 | 0.6 | 0.6 | <0.1 | <0.1 | <0.1 |
| 405 nm | 91.7 | 75.9 | 13.2 | 12.1 | 6.0 | 6.0 | 0.8 | <0.1 | <0.1 |
| 410 nm | 93.3 | 80.3 | 35.0 | 34.1 | 21.9 | 21.9 | 8.4 | 0.7 | 0.7 |

[a]curing program (degree C.) = 40—40 (3 h)—50 (7 h)—80 (9 h)—80 (1 h), Annealing = 1 h @ 110 degree C.
[b]weight percentages of the component based on the weight of the polymerizable composition
[c]component added in powder form
[d]RAV 7AX MBUVA = masterbatch containing 1 wt % of BP6 UV absorber in RAV 7AX monomer
[e]RAV 755-T MBUVA = masterbatch containing 2 wt % of BP6 UV absorber in RAV 755-T monomer

TABLE 4

Moulded articles cured in the presence of the bleaching agents (BA) H, K and L[a]

| Component (%[b]) | | Composition n. | | |
|---|---|---|---|---|
| | | 16 | 17 | 18 |
| Cut off (nm) | | 400 | 400 | 400 |
| RAV 7AX | | 88.82 | 88.82 | 88.82 |
| ADC NS30 | | 11.00 | 11.0 | 11.0 |
| BP6[c] | | 0.18 | 0.18 | 0.18 |
| BA H[d] | | 0.07 | — | — |
| BA K[d] | | — | 0.07 | — |
| BA L[d] | | — | — | 0.07 |
| YI | | 2.50 | 2.82 | 2.90 |
| Haze % | | 0.40 | 0.66 | 0.86 |
| Total T % | | 92.0 | 92.0 | 92.0 |
| T % | 400 nm | 0.9 | 0.9 | 0.9 |

[a]curing program (degree C.) 40—40 (3 h)—50 (7 h)—80 (9 h)—80 (1 h) Annealing = 1 h @ 110 degree C.
[b]weight percentage of the component based on the weight of the polymerizable composition
[c]component added in powder form
[d]bleaching agent added to the mixture after proper re-dispersion; solution cast into moulds without filtration.

The results reported in Table 2 demonstrate that the use of the aromatic component (A) in combination with a polymeric dispersing agent allows to obtain bleaching agents containing pigment particles having a very small z-average particle size and a good stability up to 1 month (sample H). Differently, when an aliphatic component A is used (sample K) or the polymeric dispersing is absent (sample L) the pigment particles tend to aggregate and flocculate after a short time (1 week) and their z-average particle size substantially increases.

The results reported in Table 1, in particular the significative lower z-average particle size and PDI of the samples F to I (160 nm-280 nm) compared to the samples A, B and E (420 nm-440 nm), show that direct sonication (DS) and the high-pressure homogenization (HPH) treatments significantly improve the dispersions of the pigment particles compared to the indirect sonication (IS) treatment.

The results of the characterization reported in Table 3 confirm that the compositions not containing any bleaching agent and including insufficient amounts of UV absorbers do not achieve a complete protection towards HEV radiations (i.e. 400 nm or higher) and exhibit, however, a low yellow index (YI), especially when an aliphatic allyl resin such as RAV 7AT is used. Compositions such as samples REF1 and REF2 of Table 3 are customarily used for the production of colorless, transparent lenses.

The results of Table 3 also show that by increasing the content of UV absorber in the polymerizable composition it is possible to achieve cut-offs at wavelengths in the blue light region, but at the expenses of a significant increase in the YI (see HEV samples 1 to 5 bis).

The performance of the bleaching agents H, K and L in a polymerizable composition containing an aliphatic polymerizable component AA were compared in Table 4. The aliphatic polymerizable component AA corresponded to the HEV composition 1 of Table 3.

The bleaching agents were redispersed by manual shaking followed by indirect sonication (30 minutes), added to the casting mixture and stirred. The casting mixture were directly poured into the moulds without any prior filtration in order to evaluate the performance of the bleaching agent in the worst operating conditions.

The results of the polymer test indicate that:
The composition 16 incorporating the bleaching agent H shows the overall best optical features in terms of both YI and final haziness of the lens;
The composition 17 incorporating the bleaching agent K shows optical parameters similar to those of sample 16, but due to tendency of the dispersion to flocculate and aggregate, the final YI and haziness are worse than those of compositions 16;
The effect of the broader particles size distribution can be inferred from sample 18 incorporating the bleaching agent L, where increased yellowness and haziness were observed.

The performance of the bleaching agents listed in Table 1 when incorporated with the polymerizable composition sample 4 of Table 3 (cut-off at the HEV wavelength of 405 nm) was further evaluated. To this end, samples 6 to 15 having the composition listed in Table 5 were casted and cured and the obtained lenses were characterized. The results of this characterization are reported in Table 5 and compared to the unbleached sample 1 of Table 3.

TABLE 5

Polymerizable compositions with 405 nm cut-off (with bleaching agent) [a]

| Component (%[b]) | Composition n. | | | | | | | | |
|---|---|---|---|---|---|---|---|---|---|
| | 1 | 6 | 7 | 10 | 11 | 12 | 13 | 14 | 15 |
| RAV 755-T | 89.7 | 89.7 | 89.7 | 89.7 | 89.7 | 89.7 | 89.7 | 89.7 | 89.7 |
| BP6 | 0.3 | 0.3 | 0.3 | 0.3 | 0.3 | 0.3 | 0.3 | 0.3 | 0.3 |
| ADC NS 30 | 10.0 | 10.0 | 10.0 | 10.0 | 10.0 | 10.0 | 10.0 | 10.0 | 10.0 |
| BA | — | A (IS) | B (IS) | E (IS) | F (IS) | G (DS) | H (DS) | H (DS) | I (HPH) |
| (homogenization) | | 0.6 | 0.6 | 0.6 | 0.6 | 0.6 | 0.3 | 0.25 | 0.3 |
| YI | 6.80 | 5.16 | 5.88 | 5.22 | 5.03 | 3.49 | 4.70 | 4.77 | 5.30 |
| Haze % | 0.34 | 0.95 | 0.45 | 0.70 | 1.32 | 1.25 | 0.51 | 0.49 | 0.52 |
| Total T % | 92.8 | 90.6 | 91.1 | 90.6 | 90.0 | 89.0 | 89.3 | 90.6 | 89.4 |
| T % 400 nm | <0.1 | <0.1 | <0.1 | <0.1 | <0.1 | <0.1 | <0.1 | <0.1 | <0.1 |
| 405 nm | 0.8 | 0.7 | 0.6 | 0.8 | 0.5 | 0.7 | 0.8 | 0.6 | 0.6 |

[a] Curing program (degree C.) = 40—40 (3 h)—50 (7 h)—80 (9 h)—80 (1 h), Annealing = 1 h @ 110 degree C.
[b] weight percentages of the component based on the weight of the polymerizable composition The bleaching agents A, B and E (samples 6, 7 and 10, respectively) were prepared by indirect sonication using a blue ultramarine pigment in combination with an additional pigment selected from red pigment, pink pigment or violet pigment, respectively, to adjust the color hue. The characterization of the lenses obtained by using the bleaching agents A, B and E showed the following results:

- compared to sample 1, incorporation of the bleaching agents A, B and E led to a decrease of the YI, which indicates that the final lens appears less yellow to a human's eye;
- compared to sample 1, incorporation of the bleaching agents A, B and E also led to an increase of the haze, the value of which however remains lower than 1%, which is a very good value;
- incorporation of the bleaching agents B and E led to a lower haze value compared to the bleaching agent A; this might be due to the smaller average size of the particles of the red and violet pigments used (i.e. average particle size of the commercial pigment used as starting material); using pigments having smaller particle size of the commercial pigment used as starting material); using pigments bleaching agents as shown by the values of PDI of samples A, B and E that are very similar;
- incorporation of the bleaching agents A, B and E reduced the total transmittance (T %) of the lenses, which however remains at values higher than 88%, that is a very good result for colorless lenses featuring a cut-off at 405 nm.

From the results of Table 5 it is evident that the use of direct sonication or high-pressure homogenization in the preparation of the bleaching agent allows to effectively correct the yellowness of the lens (i.e. decreasing the YI) brought about by the UV absorber needed to achieve a HEV cut-off (samples 11 to 15), while maintaining the other optical properties at the desired levels, particularly maintaining high levels of light transmission and acceptable levels of haze.

Moreover, the high level of dispersion of the pigment particles exhibited by the bleaching agents F to I provides the advantage of preventing or at least reducing the formation of pigment particles that are susceptible of being retained by the filters used for the filtration of the polymerizable composition before casting. The bleaching agents are thus more efficient than those produced according to the known art, as lower amounts of pigments are sufficient to achieve the same bleaching effect.

The improved effectiveness of these bleaching agents is confirmed by the experimental tests carried out on samples 6, 11 and 12, where bleaching agents A, F and G having the same or nearly the same chemical composition have been used. The samples 11 and 12, which were obtained using the bleaching agents F and G, respectively, that had been homogenized by direct sonication, both led to moulded articles having a lower YI compared to the lens prepared with the bleaching agent A (sample 6) that was homogenized by indirect sonication in an ultrasonic bath. In sample 12, however, a significant reduction of the YI was achieved with a lower dosage of the red pigment compared to sample 11 and specially to sample 6.

Similar conclusions can be drawn from the samples 13 and 14 that incorporate the bleaching agent H, which has substantially the same composition of the bleaching agent B, the latter having been treated by indirect sonication instead of direct sonication. The direct sonication allowed to obtain lower pigment particles size (200 nm) and higher level of dispersions (PDI=0.21), which in turns enabled to obtain an effective reduction of the YI, good levels of total light transmittance using a reduce dosage of bluing agent (0.30% and 0.25% for sample 13 and 14, respectively).

Comparable results to those of sample 14 have been obtained using the bleaching agent I, which has the same composition of the bleaching agent H, the bleaching agent I having been homogenized by means of a high-pressure homogenizer. The bleaching agent I is characterized by an average pigment particles size lower than that of H and by a slightly higher PDI value than that of bleaching agent H.

Comparison of moulded articles exhibiting UV- and HEV cut-offs cured in the presence and absence of bleaching agent The bleaching agent H was incorporated into the polymerizable compositions 1, 3, 4 and 5 having the compositions listed in Table 3 in order to evaluate its effectiveness in the manufacturing of lenses based on different types of allyl resins and having different cut-offs. The results are reported in the Tables 6 and 7 together with those of the corresponding moulded articles obtained starting from the same compositions but in the absence of any bleaching agent.

TABLE 6

Evaluation of UV400 packages[a]

| Component (%[b]) | 1 | 1-BA | 1-BA' | 3 | 3-BA |
|---|---|---|---|---|---|
| RAV 7AT | 88.82 | 88.68 | — | — | — |
| RAV 7AX | — | — | 88.68 | — | — |
| RAV 755-T | — | — | — | 89.85 | 89.65 |
| ADC NS30 | 11.0 | 11.0 | 11.0 | 10.0 | 10.0 |
| BP6 | 0.18 | 0.18 | 0.18 | 0.15 | 0.15 |
| BA | — | 0.14 | 0.14 | — | 0.20 |
| YI | 4.00 | 2.72 | 2.62 | 5.10 | 3.17 |
| Haze % | 0.31 | 0.38 | 0.32 | 0.34 | 0.35 |
| Total T % | 93.4 | 91.9 | 92.5 | 93.5 | 91.4 |
| T % 400 nm | 0.9 | 0.9 | 0.9 | 0.6 | 0.6 |

[a]Curing program (degree C.) 40—40 (3 h)—50 (7 h)—80 (9 h)—80 (1 h) Annealing = 1 h @ 110 degree C.
[b]weight percentages of the component based on the weight of the polymerizable composition

TABLE 7

Evaluation of HEV packages[a]

| Component (%[b]) | 4 | 4-BA | 5 | 5-BA |
|---|---|---|---|---|
| RAV 755-T | 89.7 | 89.4 | 89.4 | 89.0 |
| ADC NS30 | 10.0 | 10.0 | 10.0 | 10.0 |
| BP6 | 0.3 | 0.3 | 0.6 | 0.6 |
| BA % | — | 0.3 | — | 0.4 |
| YI | 6.80 | 4.70 | 10.40 | 7.05 |
| Haze % | 0.34 | 0.51 | 0.30 | 0.70 |
| Total T % | 92.8 | 89.3 | 92.4 | 88.02 |
| T % 400 | <0.1 | <0.1 | <0.1 | <0.1 |
| 405 | 0.8 | 0.8 | <0.1 | <0.1 |
| 410 | 3.4 | 8.4 | 0.7 | 0.7 |

[a]Curing program (degree C.) 40—40 (3 h)—50 (7 h)—80 (9 h)—80 (1 h) Annealing = 1 h @ 110 degree C.
[b]weight percentages of the component based on the weight of the polymerizable composition The results of Tables 6 and 7 show that the incorporation of the bleaching agent H allows to effectively obtain colorless and transparent lenses exhibiting the desired UV or HEV cut-off as well as acceptable level of haze when different allyl resins are used as polymerizable component AA.

Evaluation of mechanical properties and tintability of moulded articles exhibiting UV and HEV cut-offs cured in the presence and absence of bleaching agent The mechanical properties of some UV and HEV compositions have been evaluated in the presence or absence of the bleaching agent H of Table 3.

TABLE 8

Mechanical properties and tintability of UV/HEV packages[a]

| Component %[b] | 1 | 1-BA | 3 | 3-BA | 4 | 4-BA | 5 | 5-BA |
|---|---|---|---|---|---|---|---|---|
| RAV 7AT | 88.82 | 88.68 | — | — | — | — | — | — |
| RAV 755-T | — | — | 89.85 | 89.65 | 89.7 | 89.4 | 89.4 | 89.0 |
| ADC NS30 | 11.0 | 11.0 | 10.0 | 10.0 | 10.0 | 10.0 | 10.0 | 10.0 |
| BP6 | 0.18 | 0.18 | 0.15 | 0.15 | 0.3 | 0.3 | 0.6 | 0.6 |
| BA % | — | 0.14 | — | 0.20 | — | 0.3 | — | 0.4 |
| HRM, num | 87 | 87 | 93 | 93 | 92 | 92 | 92 | 92 |
| Bayer test, num | 1.1 | 1.1 | 0.8 | 0.8 | 0.7 | 0.7 | 0.7 | 0.7 |
| Dyeability Total T % | 29 | 29 | 22 | 22 | 21 | 20 | 20 | 20 |
| Color homogeneity | Yes | Yes | Yes | Yes | Yes | Yes | Yes | Yes |

[a]Curing program (degree C.) = 40—40 (3 h)—50 (7 h)—80 (9 h)—80 (1 h), Annealing = 1 h @ 110 degree C.
[b]weight percentages of the component based on the weight of the polymerizable composition The results of Table 8 show that the incorporation of the bleaching agent H allows to achieve effective UV and HEV protection without any substantial detriment to the mechanical properties and tintability of the polymerized compositions.

The invention claimed is:

1. A bleaching agent comprising:
   (A) a polymerizable component,
   (B) a colouring component comprising particles of a blue pigment (b1),
   (C) a polymeric dispersing agent to disperse the particles of the colouring component (B) in the polymerizable component (A),
      wherein the particles of the colouring component (B) have a z-average size equal to or lower than 400 nm, as measured by Dynamic Light Scattering technique according to the method ISO 22412:2017,
      wherein the polymeric dispersing agent (C) comprises a polymeric part and one or more pigment affinitive-groups selected from: carboxylic group, sulphate group, sulphonate group, amine salts, phosphate group, phosphonate group, carbamate group, urea group, amide group or amine group, and
      wherein said polymerizable component (A) is a mixture of compounds selected from the group consisting of the following Formulas (3), (4) and (5);

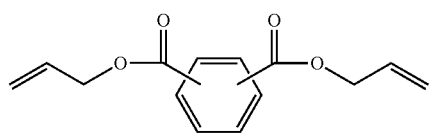
(3)

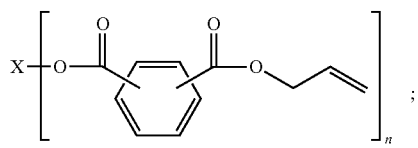
(4)

wherein in the Formula (4), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6;

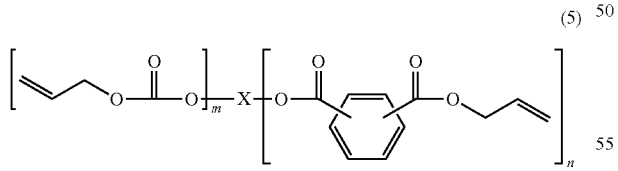
(5)

wherein in the Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6; with the proviso that when no compounds of Formula (3) and (4) are present, in the Formula (5) n represents integers of 1 to 6 and the sum of m and n is an integer of 2 to 6.

2. Bleaching agent according to claim 1, wherein said colouring component (B) is contained in the range of 0.1% to 5.0% by weight with respect to said component (A).

3. Bleaching agent according to claim 1, wherein said polymeric dispersing agent (C) is contained in the range of 0.1% to 10% by weight with respect to said component (A).

4. Bleaching agent according to claim 1, wherein said polymerizable component (A) is a compound having the following Formula 1:

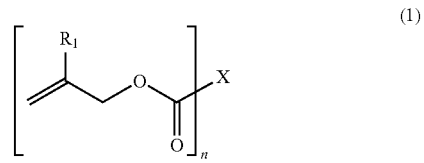
(1)

wherein in the Formula (1):
   n is an integer of 2 to 6,
   $R_1$ indicates a hydrogen atom or a methyl group, a plurality of present $R_1$'s may be the same or different,
   X is a divalent to hexavalent organic group derived from an aromatic compound having 6 to 12 carbon atoms.

5. Bleaching agent according to claim 1, wherein the colouring component (B) includes particles of one or more further pigments (b2), different from the blue pigment (b1).

6. Bleaching agent according to claim 5, wherein the weight ratio between the particles of the pigment (b1) and the particles of the pigment (b2) is within the range of from 5:1 to 15:1.

7. Bleaching agent according to claim 1, wherein the particles of the colouring component (B) have a z-average size equal to or lower than 280 nm, as measured by Dynamic Light Scattering technique according to the method ISO 22412:2017.

8. Bleaching agent according to claim 1, wherein the particles of the colouring component (B) have a z-average size equal to or higher than 20 nm as measured by Dynamic Light Scattering technique according to the method ISO 22412:2017.

9. A Process for preparing a bleaching agent according to claim 1 comprising the following steps in sequence:
   providing a pre-mixture by mixing:
   (A) a polymerizable component,
   (B) a colouring component comprising particles of a blue pigment (b1),
   (C) a polymeric dispersing agent to disperse the particles of the colouring component (B) in the polymerizable component (A),
   homogenizing the pre-mixture to obtain a bleaching agent in which the particles of the colouring component (B) have a z-average size equal to or lower than 400 nm, as measured by Dynamic Light Scattering technique according to the method ISO 22412:2017,
      wherein the polymeric dispersing agent (C) comprises a polymeric part and one or more pigment affinitive-groups selected from: carboxylic group, sulphate group, sulphonate group, amine salts, phosphate group, phosphonate group, carbamate group, urea group, amide group or amine group, and
      wherein said polymerizable component (A) is a mixture of compounds selected from the group consisting of the following Formulas (3), (4) and (5);

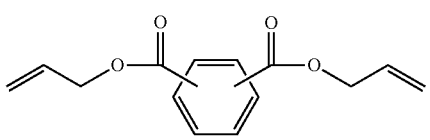

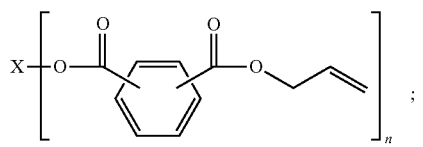

wherein in the Formula (4), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6;

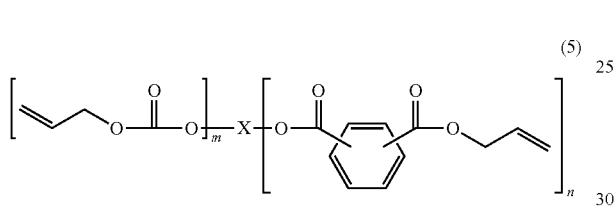

wherein in the Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6; with the proviso that when no compounds of Formula (3) and (4) are present, in the Formula (5) n represents integers of 1 to 6 and the sum of m and n is an integer of 2 to 6.

10. Process according to claim 9, wherein, in the step of providing a pre-mixture, said colouring component (B) is mixed in the range of 0.1% to 5.0% by weight with respect to said component (A).

11. Process according to claim 9, wherein, in the step of providing a pre-mixture, said polymeric dispersing agent (C) is mixed in the range of 0.1% to 10% by weight with respect to said component (A).

12. Process according to claim 9, wherein the step of homogenizing the pre-mixture is carried out by sonication by means of a sonotrode.

13. Process according to claim 9, wherein the step of homogenizing the pre-mixture is a high-pressure homogenization (HPH) step.

14. A polymerizable composition for an optical material comprising:
(A) a polymerizable component,
(B) a colouring component comprising particles of a blue pigment (b1);
(C) a polymeric dispersing agent to disperse the particles of the colouring component (B) in the polymerizable component (A);
(D) an ultraviolet absorbing agent; and
(E) a radical polymerization initiator,
wherein the particles of the colouring component (B) have a z-average size equal to or lower than 400 nm, as measured by Dynamic Light Scattering technique according to the method ISO 22412:2017,
the polymeric dispersing agent (C) comprises a polymeric part and one or more pigment affinitive-groups selected from: carboxylic group, sulphate group, sulphonate group, amine salts, phosphate group, phosphonate group, carbamate group, urea group, amide group or amine group, and
wherein said polymerizable component (A) is a mixture of compounds selected from the group consisting of the following Formulas (3), (4) and (5):

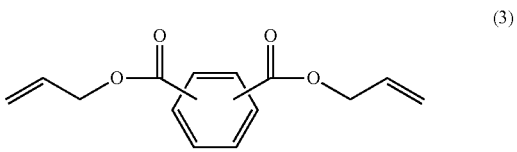

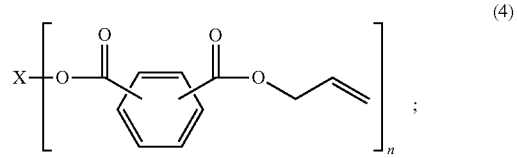

wherein in the Formula (4), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, and n is an integer of 2 to 6;

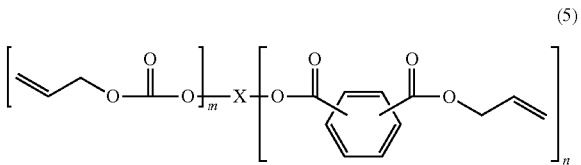

wherein in the Formula (5), X represents a divalent group derived from a linear or branched aliphatic diol having 2 to 8 carbon atoms or a trivalent to hexavalent group derived from a linear or branched aliphatic polyol having 3 to 10 carbon atoms and having 3 to 6 hydroxyl groups, m and n represent integers of 0 to 6, and the sum of m and n is an integer of 2 to 6; with the proviso that when no compounds of Formula (3) and (4) are present, in the Formula (5) n represents integers of 1 to 6 and the sum of m and n is an integer of 2 to 6.

15. A polymerizable composition according to claim 14, which further comprises a polymerizable component comprising an aliphatic or cycloaliphatic compound including two or more allyloxycarbonyl groups.

16. A process for preparing a polymerizable composition for an optical material comprising the following steps in sequence:
providing a bleaching agent;
mixing the bleaching agent with (AA) a polymerizable component comprising a compound including two or more allyloxycarbonyl groups and (D) an ultraviolet absorbing agent and (E) a radical polymerization initiator, wherein the providing the bleaching agent comprises the following steps in sequence:

providing a pre-mixture by mixing:
- (A) a polymerizable component comprising an aromatic ester compound including two or more allyloxycarbonyl groups,
- (B) a colouring component comprising particles of a blue pigment (b1),
- (C) a polymeric dispersing agent to disperse the particles of the colouring component (B) in the polymerizable component (A), homogenizing the pre-mixture to obtain a bleaching agent in which the particles of the colouring component (B) have a z-average size equal to or lower than 400 nm, as measured by Dynamic Light Scattering technique according to the method ISO 22412:2017, and wherein the polymeric dispersing agent (C) comprises a polymeric part and one or more pigment affinitive-groups selected from: carboxylic group, sulphate group, sulphonate group, amine salts, phosphate group, phosphonate group, carbamate group, urea group, amide group or amine group.

17. Process according to claim 16, wherein, in the step of providing a pre-mixture, said colouring component (B) is mixed in the range of 0.1% to 5.0% by weight with respect to said component (A).

18. Process according to claim 16, wherein, in the step of providing a pre-mixture, said polymeric dispersing agent (C) is mixed in the range of 0.1% to 10% by weight with respect to said component (A).

19. A molded article obtained by curing a polymerizable composition according to claim 14.

20. An optical material comprising the molded article according to claim 19.

21. A plastic lens comprising the molded article according to claim 19.

22. A method for manufacturing a plastic lens comprising the following steps in sequence:
- i) providing a polymerizable composition for an optical material according to claim 15;
- ii) casting the polymerizable composition in at least one mould;
- iii) curing the polymerizable composition to obtain a plastic lens.

23. Bleaching agent according to claim 1, wherein the one or more pigment affinitive-groups is selected from: carboxylic group, sulphate group, amine salts, phosphate group, phosphonate group, carbamate group, urea group, amide group or amine group.

* * * * *